(12) United States Patent
McDysan

(10) Patent No.: US 8,693,323 B1
(45) Date of Patent: Apr. 8, 2014

(54) SYSTEM AND METHOD FOR MANAGING COMMUNICATIONS IN AN ACCESS NETWORK

(75) Inventor: David E. McDysan, Great Falls, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2928 days.

(21) Appl. No.: 10/858,525

(22) Filed: Jun. 1, 2004

Related U.S. Application Data

(60) Provisional application No. 60/560,009, filed on Apr. 5, 2004.

(51) Int. Cl.
*H04L 12/28* (2006.01)
*H04L 12/56* (2011.01)

(52) U.S. Cl.
USPC .......................................... 370/230; 370/392

(58) Field of Classification Search
None
See application file for complete search history.

(56) References Cited

U.S. PATENT DOCUMENTS

| | | | |
|---|---|---|---|
| 5,734,651 A | 3/1998 | Blakeley et al. | |
| 6,205,488 B1 | 3/2001 | Casey et al. | |
| 6,499,061 B1 * | 12/2002 | Benayoun et al. | 709/245 |
| 6,603,756 B1 * | 8/2003 | Tappan | 370/351 |
| 6,775,283 B1 * | 8/2004 | Williams | 370/392 |
| 6,778,494 B1 | 8/2004 | Mauger | |
| 6,944,168 B2 * | 9/2005 | Paatela et al. | 370/401 |
| 7,227,867 B1 * | 6/2007 | Ferguson et al. | 370/395.5 |
| 7,280,560 B2 * | 10/2007 | Bruckman et al. | 370/468 |
| 7,376,085 B2 * | 5/2008 | Yazaki et al. | 370/235 |
| 2003/0043802 A1 * | 3/2003 | Yazaki et al. | 370/389 |
| 2003/0231640 A1 * | 12/2003 | Basso et al. | 370/401 |
| 2004/0017796 A1 * | 1/2004 | Lemieux et al. | 370/349 |
| 2004/0044789 A1 | 3/2004 | Angel et al. | |
| 2004/0081172 A1 | 4/2004 | Ould-Brahim et al. | |
| 2004/0156313 A1 * | 8/2004 | Hofmeister et al. | 370/229 |
| 2004/0174882 A1 * | 9/2004 | Willis | 370/395.5 |
| 2004/0221051 A1 * | 11/2004 | Liong et al. | 709/230 |
| 2005/0068933 A1 | 3/2005 | Kokkonen et al. | |
| 2006/0018313 A1 * | 1/2006 | Oki et al. | 370/389 |

FOREIGN PATENT DOCUMENTS

| | | |
|---|---|---|
| EP | 1065858 | 1/2001 |
| WO | 03/005648 | 1/2003 |
| WO | WO-03/077146 | 9/2003 |
| WO | WO-03/092226 | 11/2003 |
| WO | WO-2004/025904 | 3/2004 |

OTHER PUBLICATIONS

Zelig, et al., "Pseudo Wire (PW) Management Information Base," [on-line] [Last visited on: Jan. 26, 2004] http://www.ietf.org/internet-drafts/draft-ietf-pwe3-pw-mib-03, pp. 1-42.

(Continued)

Primary Examiner — Gregory Sefcheck

(57) ABSTRACT

System and method for managing communications in an access network is provided. The system and method utilizes carrier-tagged paths established between communicatively coupled terminating elements, such as a service or customer edge and network elements, such as a building aggregator, layer 2 switch, or the like. The carrier-tagged paths may be nested within one another, and carrier-tagged paths may be aggregated together to simplify switching. Carrier-tagged flows carried over the carrier-tagged paths include one or more carrier tags prepended to terminating element traffic. For example, in an embodiment, inbound carrier-tagged flows from multiple sources destined for a common service edge may be merged by prepending a common carrier tag. In another embodiment, outbound carrier-tagged flows are nested within other carrier-tagged flows.

98 Claims, 25 Drawing Sheets

(56) References Cited

OTHER PUBLICATIONS

Shah, et al, "Qos Signaling for PW," [on-line] [Last visited on: May 27, 2004] http://www.ietf.org/internet-drafts/draft-shah-pwe3-pw-qos-signaling-00, pp. 1-7.

Bryant, et al., "PWE3 Architecture," [on-line] [Last visited on: May 27, 2004] http://www.ietf.org/internet-drafts/draft-ietf-pwe3-arch-06, pp. 1-34.

Xiao, et al., "Requirements for Pseudo-Wire Emulation Edge-to-Edge (PWE3)," [on-line] [Last visited on: Jan. 17, 2004] http://www.ietf.org/internet-drafts/draft-ietf-pwe3-requirements-08,. pp. 1-20.

Martini, et al., "Pseudowire Setup and Maintenance Using LDP," [on-line] [Last visited on: Jun. 1, 2004] http://www.ietf.org/internet-drafts/draft-ietf-pwe3-control-protocol-06, pp. 1-31.

Zelig, et al., "Ethernet Pseudo Wire (PW) Management Information Base," [on-line] [Last visited on: Jan. 26, 2004] http://www.ietf.org/internet-drafts/draft-ietf-pwe3-enet-mib-03, pp. 1-21.

Zelig, et al., "Pseudo Wire (PW) Over MPLS PSN Management Information Base," [on-line] [Last visited on: Feb. 3, 2004] http://www.ietf.org/internet-drafts/draft-ietf-pwe3-pw-mpls-mib-04, pp. 1-25.

Nadeau, et al., "Pseudo Wire (PW) Virtual Connection Verification," [on-line] [Last visited on: May 27, 2004] http://www.ietf.org/internet-drafts/draft-oetf-pwe3-vccv-02, pp. 1-16.

Bonica, et al., "ICMP Extensions for Multiprotocol Label Switching," [on-line] [Last visited on: May 27, 2004] http://www.ietf.org/internet-drafts/draft-bonica-icmp-mpls-02, pp. 1-10.

Williams, Mark, "Optical Ethernet Architecture Evolution: The Logical Provider Edge," Metro Ethernet Forum (Aug. 28, 2003) pp. 1-35.

Lang, Tao, "Making the Fiber Connection," Fiberoptic Product News, vol. 19, No. 2, Reed Electronic Group, New Jersey (Feb. 2004) 2 pages.

\* cited by examiner

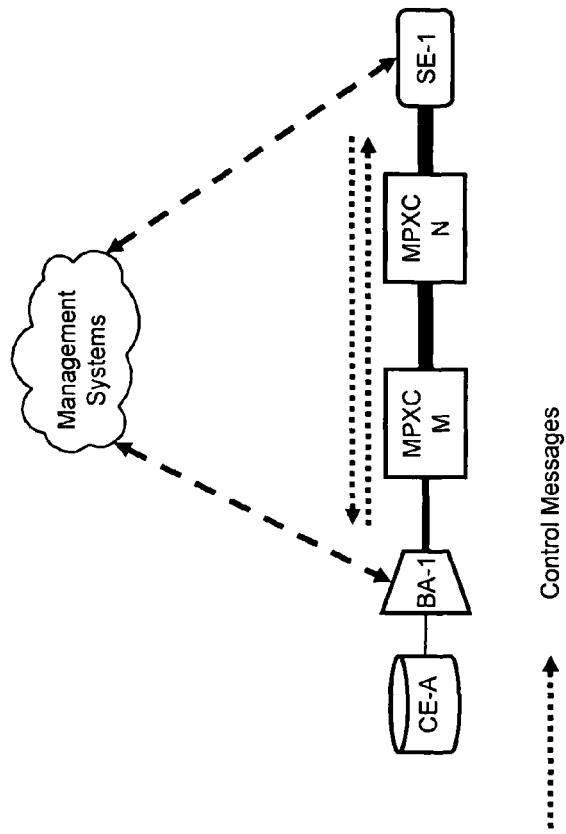
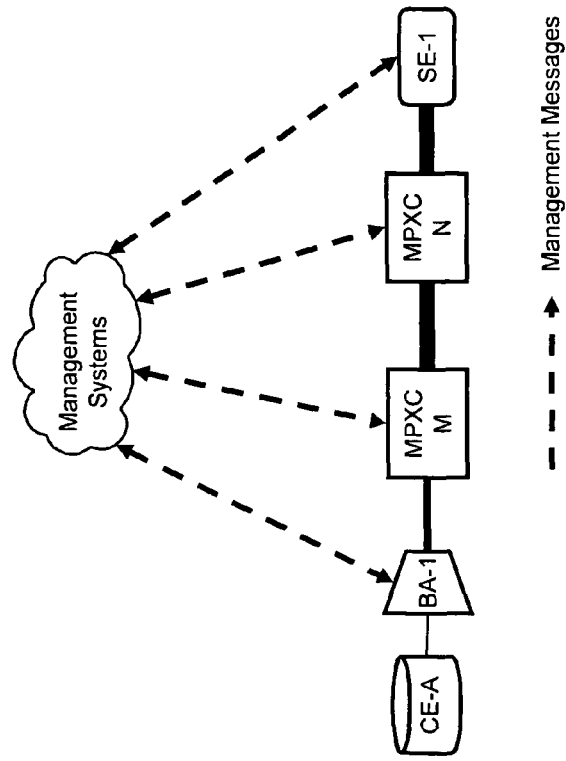

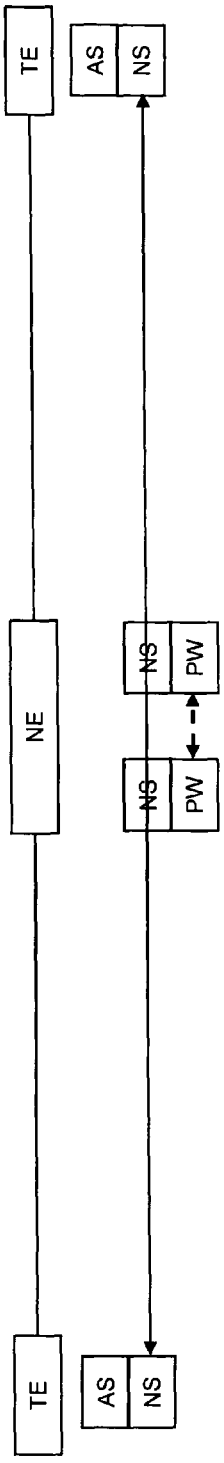
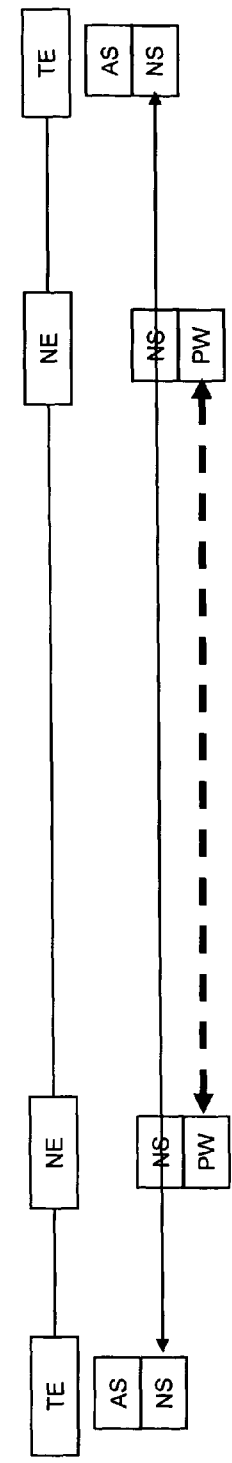
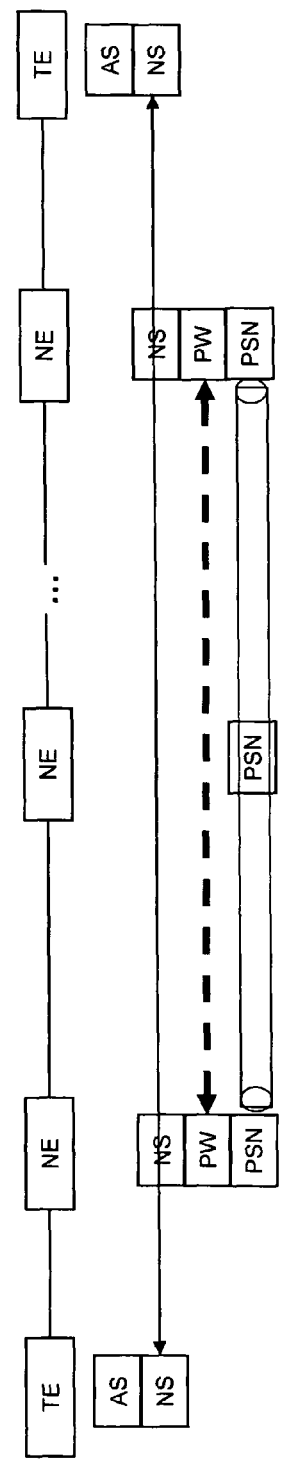
Fig. 22a
Fig. 22b
Fig. 22c

SYSTEM AND METHOD FOR MANAGING COMMUNICATIONS IN AN ACCESS NETWORK

PRIORITY CLAIM AND CROSS-REFERENCE TO RELATED APPLICATIONS

This application claims the benefit of U.S. Provisional Application No. 60/560,009, filed on Apr. 5, 2004, entitled "System and Method for Using Labeled Flows in a Communications Access Network," which is hereby incorporated herein by reference.

CROSS-REFERENCE TO RELATED APPLICATIONS

The present application is also related to the following co-pending applications, which are assigned to the assignee of the present application and incorporated herein by reference in their entireties:

U.S. patent application Ser. No. 10/858,502, filed concurrently herewith and entitled "System and Method for a Communications Access Network;"

U.S. patent application Ser. No. 10/858,501, filed concurrently herewith and entitled "System and Method for Controlling Communication Flow Rates;"

U.S. patent application Ser. No. 10/858,491, filed concurrently herewith and entitled "Apparatus and Method for Terminating Service Emulation Instances;"

U.S. patent application Ser. No. 10/858,503, filed concurrently herewith and entitled "Method and Apparatus for Processing Labeled Flows in a Communications Access Network;" and U.S. patent application Ser. No. 10/858,517, filed concurrently herewith and entitled "System and Method for Providing A Multiple-Protocol Crossconnect."

The present invention relates generally to a system and method for providing communications services, and more particularly, to a system and method for providing carrier-tagged paths in an access network.

BACKGROUND

Presently, a provider of voice and/or data communications services operates a communications network that serves a large number of geographically diverse sites, such as cities or metropolitan areas across the nation. The customers of such services may include small-to-large business enterprises or personal users of voice/data services. Communications services may span between different sites of a single business enterprise or may include communications between business enterprises in support of a business relationship. Each concentration of customers or sites that are served by a service provider in a city or metropolitan area may be served by a so-called "point of presence" for the service provider.

Customer sites in the vicinity of a point of presence, that are typically within the range of a few miles of the point of presence, may be connected to the point of presence via some form of access circuit. Traditionally, it has been more practical for a service provider to operate one or more points of presences to serve a large number of customers in a metropolitan area rather than to extend the service provider's core network for one or more services to each physical location where customers may reside. Sometimes an access circuit involves routing a coaxial cable or fiber-optic cable between the point of presence and the customers' sites. More often, however, the existing facilities of a local telephone carrier are leased to provide this connectivity. The well-established local telephone facilities provide at least twisted-pair subscriber loop connectivity to virtually every potential customer location in a metropolitan area. In the case of larger business locations and multi-tenant commercial sites, local telephone facilities typically comprise a large quantity of telephone wires or even provide for wideband or broadband access to the sites.

The portion of the communications network that connects to a customer is typically referred to as the access network. Generally, the access network provides localized communications services between a customer and the edge of a core network. The access network includes what many people refer to as "the last mile," that is, the connectivity from the house or business to the point of presence. This is the most visible part of the network from the consumers' point of view. The core network, on the other hand, is the transport carrier that handles the dynamic routing of the customer's traffic dependent upon routing instructions.

Often times, the access network and the core network are operated by different service providers. In these situations, the boundaries of the network under the control and operations of a single service provider are typically referred to as a service edge. The access network may be a small network comprising elements that perform some degree of aggregation or routing of information and traffic. In many cases, the access network performs switching or routing based upon predetermined parameters, such as service requirements, provisioning data, and the like.

The services required by customers, residential or business, vary greatly in the type of access services, bandwidth, quality of service (QoS), type of legacy equipment, and the like. Types of services typically include access to the Internet, virtual private Internet Protocol, frame relay services, asynchronous transfer mode (ATM) services, broadband services, point-to-point private line services, voice services, and the like. Typically, the access network provides transport, aggregation, grooming, and switching for each of these types of services independently, which in turn requires the access service provider to provision each of these services separately. Each type of service utilizes different interface and framing standards, and in particular, each type of service typically utilizes different sets of protocols. As a result, access networks may be equipped to interface with and evaluate flows for each type of interface for which the switch is expected to route. In an environment in which voice, frame relay, ATM, TDM private line, and Ethernet customers are desired to be supported by a single switch, there is considerable overhead and complexity associated with processing the various types of services. In many cases, this cannot be effectively accomplished via a single switching device, resulting in multiple switches and resultant parallel networks.

To reduce the overhead associated with supporting the various types of services throughout the access network, it would be preferable to aggregate the traffic for transmission on a common transport or virtual connection, such as a pseudowire, VLAN, or the like. However, the use of a virtual access connection between each customer and each type of customer service may result in a large number of virtual access connections. For example, a metro area having 10 layer 2 switches, 1,000 building aggregators per layer 2 switch, 10 customer edges per building aggregator, each customer requiring on average 2 (or more) services requires 200,000 virtual access connections. Therefore, there is a need to provide virtual circuits across an access network that does not place such a burden on the service edge or other network elements.

SUMMARY

These and other problems are generally solved or circumvented, and technical advantages are generally achieved, by preferred embodiments of the present invention which provides automatic establishment, management, and efficient operation of carrier-tagged paths in an access network.

In accordance with an embodiment of the present invention, a method for providing communications in an access network is provided. The method comprises receiving on a first interface a first packetized communication via a carrier-tagged flow, each packet of the first packetized communication having one or more carrier tags prepended to a carrier-tagged flow payload; determining a second interface on which the first packetized communication is to be routed, the second interface being based upon the first interface and an outermost carrier tag; and routing the first packetized communication to the second interface.

In accordance with another embodiment of the present invention, a method for providing communications in an access network is provided. The method comprises receiving a first carrier-tagged flow from a first network device, the first carrier-tagged flow having one or more packets, each packet having one or more carrier tags; determining a first carrier-tagged path to which the first carrier-tagged flow is to be routed, the determining being based at least in part on a first outermost carrier tag of the carrier tags; and routing the first carrier-tagged flow to the first carrier-tagged path.

In accordance with yet another embodiment of the present invention, a method for providing communications in an access network is provided. The method comprises receiving a first carrier-tagged flow from a first network device, the first carrier-tagged flow having one or more packets, each packet having one or more carrier tags; determining a second network device to which the first carrier-tagged flow is to be routed, the determining being based at least in part on a first outermost carrier tag of the carrier tags; pushing a second outermost carrier tag onto each packet of the first carrier-tagged flow, the second outermost carrier tag indicating a second carrier-tagged flow within which the first carrier-tagged flow is nested; and routing the second carrier-tagged flow to the second network device.

In accordance with still another embodiment of the present invention, a method for providing communications in an access network is provided. The method comprises determining a first carrier tag, the first carrier tag indicating a first carrier-tagged flow established between a first network element and a terminating element over which a first packetized communication is to be sent; prepending the first carrier tag on each packet of the first packetized communication, creating a first carrier-tagged flow; and transmitting the first carrier-tagged flow to a first network element.

In accordance with another embodiment of the present invention, a method for providing communications in an access network is provided. The method comprises receiving communications from a first network device, the communications comprising one or more packets; determining a terminating element to which the communications are to be sent; pushing a first carrier tag on each packet of the communications, the first carrier tag indicating a first carrier-tagged flow; pushing a second carrier tag on each packet of the communications, the second carrier tag indicating a second carrier-tagged flow, the first carrier-tagged flow being nested within the second carrier-tagged flow; and transmitting each packet on the second carrier-tagged flow to a second network element.

In accordance with still yet another embodiment of the present invention, a method for providing communications in an access network is provided. The method comprises (a) receiving communications from a first network device, the communications comprising one or more packets; (b) determining a first action to be performed, the determining the first action being performed at least in part by using the first network device as an index to a lookup table; (c) performing the first action, the first action modifying an outermost label of the packets; (d) determining a next hop associated with the first action, the determining the next hop being performed at least in part by using the lookup table; (e) determining, if the next hop is not a physical interface, a second action, the determining the second action being performed at least partially by traversing the lookup table where the next hop is an index to determine the second action; (f) performing the second action, the second action modifying the outermost label or adding a second outermost label of the packets; (g) repeating steps (d)-(f) until the next hop is a physical interface; (h) routing the communications to the physical interface.

In accordance with another embodiment of the present invention, a method for providing communications in an access network is provided. The method comprises receiving a first packetized communications from a first network device, the first packetized communications comprising one or more packets, each packet having a first carrier-tag and a second carrier tag prepended to a carrier-tagged flow payload; popping the first carrier tag thereby creating a second packetized communications comprising the second carrier tag prepended to the carrier-tagged flow payload; determining a terminating element to which the second packetized communications are to be sent, the determining being based at least in part on the first carrier tag; and transmitting the second packetized communications to the terminating element.

In accordance with yet another embodiment of the present invention a method for providing communications in an access network, is provided. The method comprises receiving a first packetized communication from a first network device, the first packetized communication comprising one or more packets, each packet having a first carrier-tag prepended to a carrier-tagged flow payload; determining a terminating element to which the first packetized communication are to be sent, the determining being based at least in part on the first carrier tag; and transmitting the first packetized communication to the terminating element.

In accordance with another embodiment of the present invention, a method for providing communications in an access network is provided. The method comprises receiving a first carrier-tagged flow from a first network device, the first carrier-tagged flow having one or more packets, each packet having a first carrier tag and a second carrier tag prepended to a carrier-tagged flow payload; popping the first carrier tag from the each packet of the first carrier-tagged flow, thereby creating a second carrier-tagged flow comprising the second carrier tag prepended to the carrier-tagged flow payload; determining a destination network element to which the second carrier-tagged flow is to be routed, the destination network element being based at least in part on the first carrier tag; and routing the second carrier-tagged flow to the destination network element.

In accordance with still another embodiment of the present invention, a method for providing communications in an access network is provided. The method comprises receiving a first carrier-tagged flow from a first network device, the first carrier-tagged flow comprising a first carrier tag prepended to a first nested carrier-tagged flow and a second carrier tag prepended to a second nested carrier tagged flow; popping the first carrier tag from the first nested carrier-tagged flow; determining a first destination network element to which the first nested carrier-tagged flow is to be routed, the determining the first destination network element being based at least in part on the first carrier tag; routing the first nested carrier-tagged flow to the first destination network element; popping the second carrier tag from the second nested carrier-tagged flow; determining a second destination network element to which the second nested carrier-tagged flow is to be routed, the determining the second destination network element being based at least in part on the second carrier tag; and routing the second nested carrier-tagged flow to the second destination network element.

In accordance with another embodiment of the present invention, a method for providing communications in an access network is provided. The method comprises receiving a carrier-tagged flow from a first network device, the carrier-tagged flow comprising one or more packets, each packet comprising a carrier tag prepended to a carrier-tagged flow payload; popping the carrier tag from each packet; determining a terminating element to which the communications are to be sent, the determining being based at least in part on the carrier tag; and transmitting the carrier-tagged flow payload to the customer edge.

In accordance with another embodiment of the present invention, a method for provisioning carrier-tagged flows within an access network is provided. The method comprises establishing a first carrier-tagged flow between a layer 2 switch and a service edge, the layer 2 switch being communicatively coupled to one or more building aggregators; and establishing a second carrier-tagged flow between each building aggregator and the service edge, the second carrier-tagged flow being nested within the first carrier-tagged flow.

In accordance with another embodiment of the present invention, a method for provisioning carrier-tagged flows within an access network is provided. The method comprises establishing a first carrier-tagged flow between a layer 2 switch and a service edge, the layer 2 switch being communicatively coupled to one or more building aggregators; establishing, for each building aggregator communicatively coupled to the layer 2 switch, a second carrier-tagged flow nested within the first carrier-tagged flow; and establishing a third carrier-tagged flow between each building aggregator and the service edge, the third carrier-tagged flow being nested within the second carrier-tagged flow.

In accordance with another embodiment of the present invention, a method for implementing a proxy function by a first network element is provided. The method comprises receiving by the first network element communications from a second network element, the first network element performing for the first terminating element a first forwarding proxy function that includes pushing a first carrier tag on the communications from the second network element to form a first carrier-tagged flow; pushing a second carrier tag on the first carrier-tagged flow to form a second carrier-tagged flow; determining a third network element to which the second carrier-tagged flow is to be routed, the determining being based at least in part on the second carrier tag; and sending the second carrier-tagged flow to the third network element.

In accordance with another embodiment of the present invention, a method of providing network control is provided. The method comprises establishing a first control link between a proxy signaling agent and a first network element; associating a first interface between the first network element and a first terminating element with the first control link; directing control messages received from the first terminating element on the first interface by the first network element over the first control link to the proxy signaling agent; and responding by the proxy signaling agent to control messages received from the first terminating element by sending messages to the first network element over the first control link.

In accordance with yet another embodiment of the present invention, a method of performing proxy agent signaling by a first network element is provided. The method comprises receiving by the first network element a control signal from a second network element, the control signal comprising an identifier; determining a third network element to which the control signal is directed, the determining being based at least in part on the identifier; and acting by the first network element as a proxy signaling agent for the third network element, the acting including responding to the control signal for the third network element.

In accordance with another embodiment of the present invention, a method of providing dynamic access control is provided. The method comprises negotiating between a first network device and a second network device for use of a resource; requesting from an access control system a change in access capacity between the first network device and the second network device; receiving notification that the access control system effected the change in access capacity; and using the resource in accordance with the change.

In accordance with another embodiment of the present invention, a method for establishing carrier-tagged paths within an access network is provided. The method comprises establishing a carrier-tagged path between a first network element and a first terminating element, the carrier-tagged path being identified by a first carrier tag; distributing a second carrier tag to one or more customer terminating equipment communicatively coupled to the first network element; associating the second carrier tag with the first carrier tag; receiving communications from the customer terminating equipment, the communications including the second carrier tag; and sending the communications to the first terminating element on the carrier-tagged path.

It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 14a-14b illustrate a comparison of provisioning methods in accordance with embodiments of the present invention;

FIGS. 22a-c illustrate network configurations that may be implemented in accordance with an embodiment of the present invention.

DETAILED DESCRIPTION OF ILLUSTRATIVE EMBODIMENTS

Figure 1:
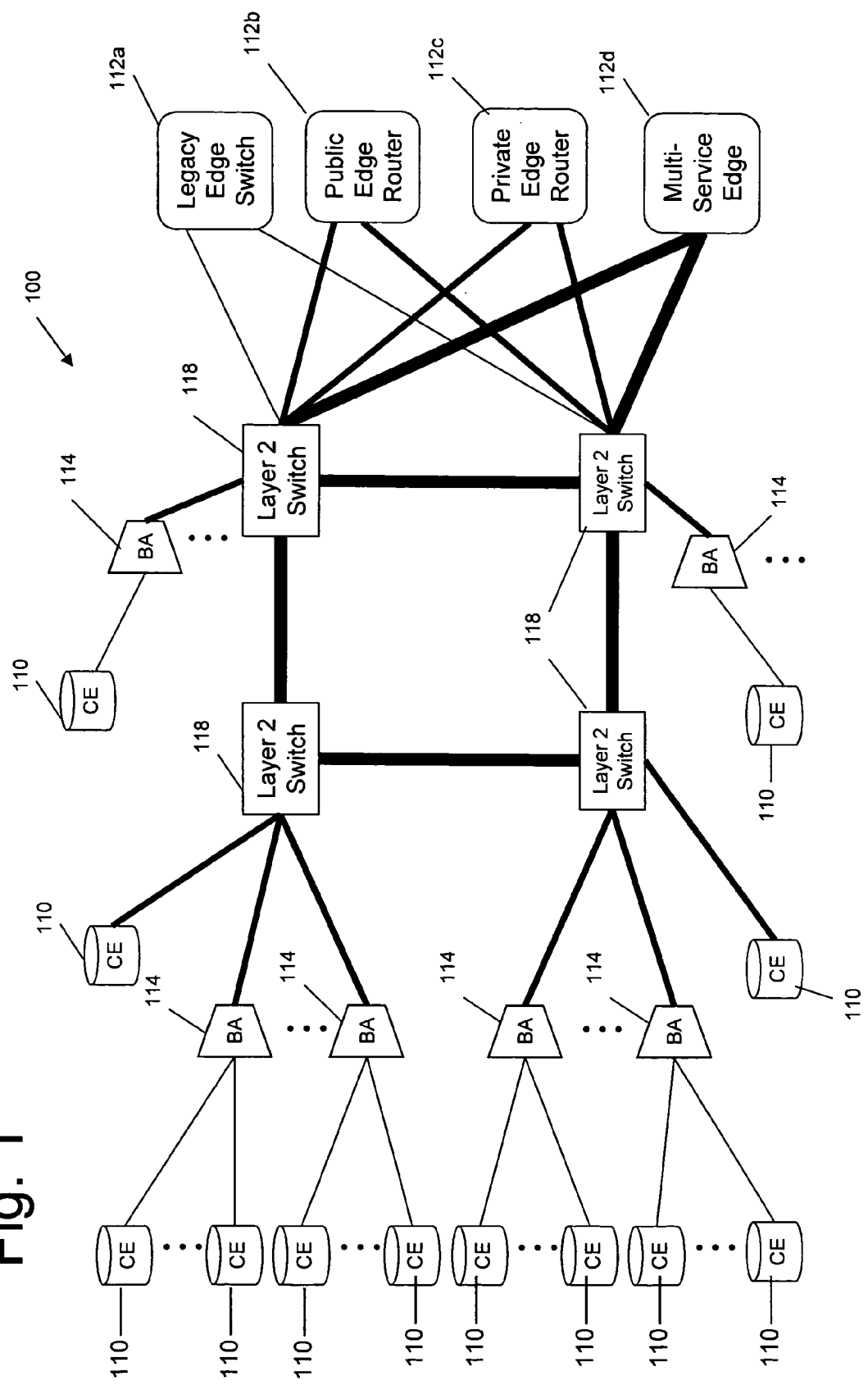
FIG. 1 is a network diagram in accordance with an embodiment of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, such as providing switching and routing services in an access network utilizing carrier-tagged paths implemented across layer 2 switching elements. The invention may employ other techniques to carry communications flows and may also be applied to other types of devices, networks, communications links, and the like. Furthermore, while specific network configurations are illustrated and discussed herein, it is noted that network configurations may vary to include fewer or additional elements, such as IP routers, gateways, bridges, ATM switches, frame relay switches, firewalls, Ethernet switches, and the like. The illustrated embodiments are provided for illustrative purposes only and are provided only to aid in the explanation and understanding of the concepts of the present invention.

Aspects of the present invention are equally applicable to many types and configurations of networks and communications protocols.

It is further noted that, unless indicated otherwise, all functions described herein may be performed in either hardware or software, or some combination thereof. In an embodiment, the functions are performed by a processor such as a computer or an electronic data processor in accordance with code such as computer program code, software, and/or integrated circuits that are coded to perform such functions, unless indicated otherwise.

Generally, the present invention provides one or more logical pipes or PSN tunnels through which communications may be sent across the access network from a customer edge device to a service edge device, wherein communications may be identified by one or more carrier tags that are applied to any or all of the traffic and which have significance for how the traffic is to be handled in the access network. Quality of service (QoS) measures, such as rate shaping and policing, may be applied at any or all of the customer edge device or the building aggregator (BA) and the service edge device. Where the layer 2 switch offers direct customer interfaces, the layer 2 switch may also be involved in functions such as rate shaping, policing, and the like to provide a specific QoS. Other possible services in the access network include prioritization and/or marking of non-conforming traffic. Other aspects of the role of the layer 2 switch may include the functions, interfaces, and protocols needed to establish layer 2 forwarding of customer traffic across the access network in support of access to other services and/or native connections between customers.

FIG. 1 is a network diagram in accordance with an embodiment of the present invention. FIG. 1 illustrates an access network 100 by which customer edges 110 are coupled to, and accesses the services of, one or more service edges, such as a legacy edge switch 112a, a public edge router 112b, a private edge router 112c, a multi-service edge 112d, or the like. The legacy edge switch 112a, public edge router 112b, private edge router 112c, and multi-service edge 112d are collectively referred to as a service edge 112.

Generally, the service edge 112 represents the access point to a service provider's network, which may comprise one or more core networks (not shown). A core network may comprise, for example, a system of TDM switches, such as a network of Class 3 telephone switches. A core network may also comprise an ATM and/or a frame relay network covering much the same geographical territory as the TDM network. Moreover, a network of IP routers may also be supported in the core network. While each network may overlap or cover much the same geographical territory, each are designed to efficiently carry particular types of traffic or exhibit particular properties that are amenable to certain types of traffic. Although this "multiplanar" network situation may frequently be encountered, it should be understood that the present invention may be equally applicable to a converged core network where native layer 2 handoff at the service edge is preferred.

The customer edge 110 is communicatively coupled to one or more building aggregators 114 and represents sources of different types of communications. For example, one of the sources may be an Ethernet customer coupled to a building aggregator 114 over any form of connectivity amenable to Ethernet traffic, such as a 100BaseT or DSL connection. Another source of traffic may be a private line customer, which may be coupled to a building aggregator 114 via DS1 line. Frame relay customers having their frame relay traffic carried over traditional TDM facilities such as DS1 lines to a building aggregator 114 and asynchronous transfer mode (ATM) customers having their ATM cell traffic carried over traditional TDM facilities such as DS1 lines to a building aggregator 114 are other examples of sources of communications. Other sources and types of communications may be used.

To provide connectivity toward service edge 112, the building aggregators 114 may be coupled to a layer 2 switch, referred to as a layer 2 switch 118, via a communications link such as a DS3 communications link or the like. The layer 2 switch 118 provides switching and routing of traffic based upon information applied to the traffic, the information corresponding roughly to Layer 2 or the "data link layer" of the OSI Reference Model.

An example of a building aggregator 114 suitable for use with the present invention is disclosed in U.S. patent application Ser. No. 10/858,503, which is incorporated herein by reference.

It should be understood that the communications link communicatively coupling the building aggregator 114 and the layer 2 switch 118 may be any suitable communications link, such as an optical fiber, optical ring, a gigabit Ethernet (GbE) connection, or the like. It is also worth noting that the layer 2 switch 118 may be coupled to a large number of building aggregators 114 to perform an intermediate aggregation and distribution function within the access network 100 and that the layer 2 switch 118 may be coupled to other layer 2 switches to provide a network of interconnected layer 2 switches, providing aggregation and routing services throughout the access network. The layer 2 switch 118 may also be coupled directly to a customer edge 110.

In accordance with the present teachings, the building aggregators 114 can be equipped to serve as one end of a plurality of carrier-tagged flows. A carrier-tagged flow represents a logical communications channel or flow established to carry communications between two or more parties, or two or more points served by a communications system. The carrier-tagged communications can be voice, data, audio, video, or any other type of communications.

A carrier-tagged flow may be implemented using a service emulation instance, such as a pseudowire as described in an IETF's Internet Draft entitled "PWE3 Architecture" (file "draft-ietf-pwe3-arch-06.txt"), which is incorporated by reference. This technology allows a packet-switched network to emulate other types of packet or TDM transport services. For example, a pseudowire may be implemented in an Ethernet network, yet may provide transport of communications that mimics the attributes and performance of common data link protocols, such as ATM, frame relay, as well as SONET/SDH or DSn signals. An Ethernet-based pseudowire may employ variable length packets even when carrying fixed-length cells or frames, such as 53-byte ATM cells.

A pseudowire is typically implemented within a tunnel implemented in a packet-switched network. Some types of PSN tunnels that may be suitable for carrying pseudowires, or other types of communications that may be employed in conjunction with the present teachings, include Label Switched Paths (LSPs) according to the MultiProtocol Label Switching (MPLS) protocol, Layer 2 Tunneling Protocol (L2TP) tunnels, Generic Routing Encapsulation (GRE) tunnels, IPsec tunnels, etc.

Another example of a technique suitable for implementing a carrier-tagged flow is a logical networking tagged flow, such as virtual local-area network (VLAN) communications or the like. A technique for achieving VLAN logical subnetworking is described in IEEE Standard 802.1Q. Briefly, a VLAN provides for designating and acting upon data packets in a manner that makes multiple LAN communication flows carried over a commonly shared communication path appear to be partitioned from one another as if traveling over separate, dedicated LAN connections. In accordance with an embodiment of the present teachings, a VLAN tagging approach may also be used for carrier-tagging of flows.

In accordance with the present teachings, carrier VLAN tags having significance for routing and processing in the access network are used to encapsulate and tag customer flows, which may or may not contain additional imbedded VLAN tags having significance within the customer's virtual network in accordance with typical 802.1Q usage. In accordance with the present teachings, the VLAN tagging approach is conveniently reused for carrier-tagging purposes and may be locally significant on any port, with tag values possibly being replaced on a hop-by-hop basis.

In accordance with the present teachings, carrier tags which are applied to traffic to support handling of flows through an access network, whether in the form of tunnel labels, pseudowire labels, VLAN tags, etc., may be 'stackable' to any depth to support efficient flow management in the context of hierarchical aggregation and distribution between service edge(s) and customer locations.

In addition to supporting access communications that enable carrier tag stacking, a building aggregator in accordance with the present teachings may serve several roles in the context of a service-agnostic access network. The building aggregator adapts a wide variety of customer traffic to be carried in the form of carrier-tagged flows. Where a packet switched network is used as an underlying access transport, the use of carrier-tag switching enables the efficiencies and flexibility of packetization to be realized in an access network without burdening the access network elements with the specific protocols or addressing used in the carried traffic.

To coordinate the assigning of carrier tags to traffic flows, the building aggregator may participate in label resolution protocols with other elements and may receive provisioning instructions from remote management systems. To support the deployment of service emulation, such as pseudowire technology, in an access network to achieve service flexibility, the building aggregator may serve as a terminal end for a large number of service emulation instances of different emulated types and may provide mapping and forwarding between customer flows and access network paths as identified by tunnel labels or service emulation instance mapping identifiers. The building aggregator may also implement QoS functions for all types of flows, augmenting similar measures that may be performed at a service edge. Other important roles and functions of the building aggregator will be described below.

Building aggregator 114 is preferably used in a carrier-tag oriented access network wherein each carrier-tagged flow is identified by a carrier tag having a particular tag value. For example, a carrier-tagged flow implemented as a service emulation instance is identified by a service emulation instance mapping identifier. In the case in which a pseudowire is used as a service emulation instance, the service emulation instance mapping identifier may take the form of a pseudowire label. Carrier tags may be locally significant on any port and the tags can be swapped on a hop-by-hop basis as needed to provide a large number of flows using the finite number of identifier values that are available (approximately 1 million in the case of pseudowire labels). To construct a large access network, hierarchy may be desirable and may be implemented by stacking carrier tags such that a multiplicity of carrier-tagged flows between a pair of nodes is carried within another carrier tagged flow. In this manner, switching in the access network can be simplified by encapsulating traffic in carrier-tagged flows and by interpreting and manipulating the corresponding carrier tags.

An access network in accordance with the present teachings may transparently support a mixture of flow types and customer content, including any customer-specific addressing or virtual networking fields imbedded in the customer content. The pseudowire architecture provides one example of an approach involving encapsulation and labeling of traffic that may be adapted for use as a carrier-tagged flow. It should be noted, however, that other protocols may be used, and embodiments of the present invention may be implemented with other types of protocols and physical connections.

The building aggregator 114 couples traffic of various types, such as traffic from the CPE 116a-116d, onto the appropriate corresponding carrier-tagged flows established for reaching the service edge. Where service emulation instances are used as carrier-tagged flows, the service edge or some other intermediate network element may serve as the other end of a number of service emulation instances which have originated at one or more building aggregators 114 and passed through layer 2 switches 118.

In an exemplary embodiment, Ethernet is utilized as the layer 2 protocol over which carrier-tagged communications are transmitted. The application of Ethernet in the access network can be based on TDM encapsulation, using X.86 or GFP, e.g. Ethernet over SONET (EoS). While Ethernet is desirable because it supports variable length packets or frames, other protocols may be used.

In the discussion that follows, MPLS PSN tunnels and pseudowires are used as examples of carrier-tagged paths for illustrative purposes only. Other types of carrier-tagged paths, such as logical networking tagged flows and other types of service emulation instances, may be used.

Figure 2:
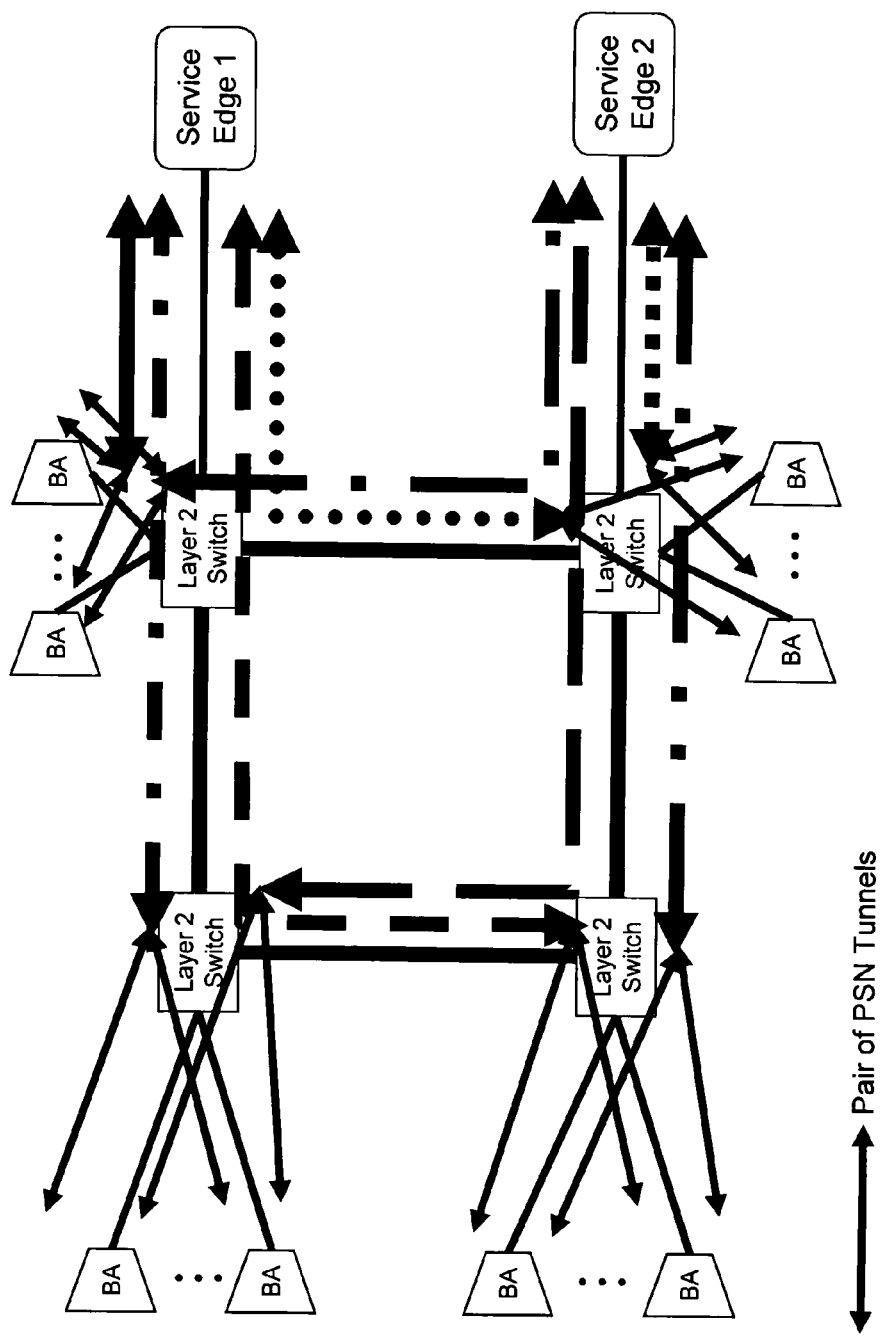
FIG. 2 illustrates a conceptual view of an embodiment of the present invention.

FIG. 2 illustrates a conceptual view of an embodiment of the present invention. In particular, FIG. 2 illustrates a forwarding design using pseudowires and MPLS PSN tunnels that enhances and extends the forwarding design from the pseudowire edge-to-edge emulation (PWE3) architecture by introducing hierarchy and proxy signaling aggregation in accordance with an embodiment of the present invention.

Generally, MPLS Label Switched Paths (LSPs) and pseudowires are uni-directional. Thus, in order to achieve bi-directional communications, a pair of PSN tunnels and pseudowires are established, unless the two nodes are immediately adjacent to each other, in which case only a pseudowire in each direction is necessary. In the inbound direction, the MPLS PSN tunnel is a multipoint-to-point tree from every building aggregator to the serving layer 2 switch, which merges all of these PSN tunnels into a single PSN tunnel to the destination service edge. In the outbound direction, the MPLS PSN tunnel between each service edge and each building aggregator uses MPLS label stacking hierarchy to have a single PSN tunnel from the service edge to the layer 2 switch, and then split out the PSN tunnel to each destination building aggregator. Across these PSN tunnels, pseudowires are established in each direction between each customer edge and the corresponding service edge. In this case pseudowire LDP proxy signaling in the layer 2 switch distributes signaling state to the layer 2 switches, reducing the signaling burden on the service edge by aggregating pseudowire LDP signaling at each layer 2 switch for all of the building aggregators that it serves.

The MPLS PSN tunnels therefore aggregate the traffic from all BAs for switching across one or more layer 2 switches before handoff to a service edge. As the number of layer 2 switches in a metro area increases, the hierarchical MPLS PSN tunnel can significantly reduce provisioning and simplify traffic engineering, restoration and grooming as compared with the straightforward application of PSN tunnels per the PWE3 architecture while still avoiding the intermediate pseudowire cross-connects.

In this approach, there are actually two pseudowire cross connects, one originating at a building aggregator and one originating at a service edge in each direction. The set of pseudowires from the building aggregators logically merge into a shared PSN tunnel as shown in FIG. 2, while the pseudowires and PSN tunnels originating at the service edge identifies the destination building aggregator.

For example, FIG. 2 illustrates a pair of carrier-tagged paths, e.g., PSN tunnels (illustrated by the larger double-arrow lines), established between each building aggregator and service edge. Carrier-tagged paths, e.g., pseduowires (illustrated by the smaller double-arrow lines), established between the building aggregators and the service edges provide a path by which communications belonging to a specific customer and service type may be identified. It should be noted that additional carrier-tagged flows may be merged onto a single carrier-tagged path. It should also be noted that FIG. 2 is a conceptual view and that the handling of inbound communications (communications from the customer edge to the service edge) may differ from the handling of outbound communications (communications from the service edge to the customer edge). The handling of inbound communications and outbound communications are discussed in greater detail with reference to FIGS. 4-6.

Figure 3:
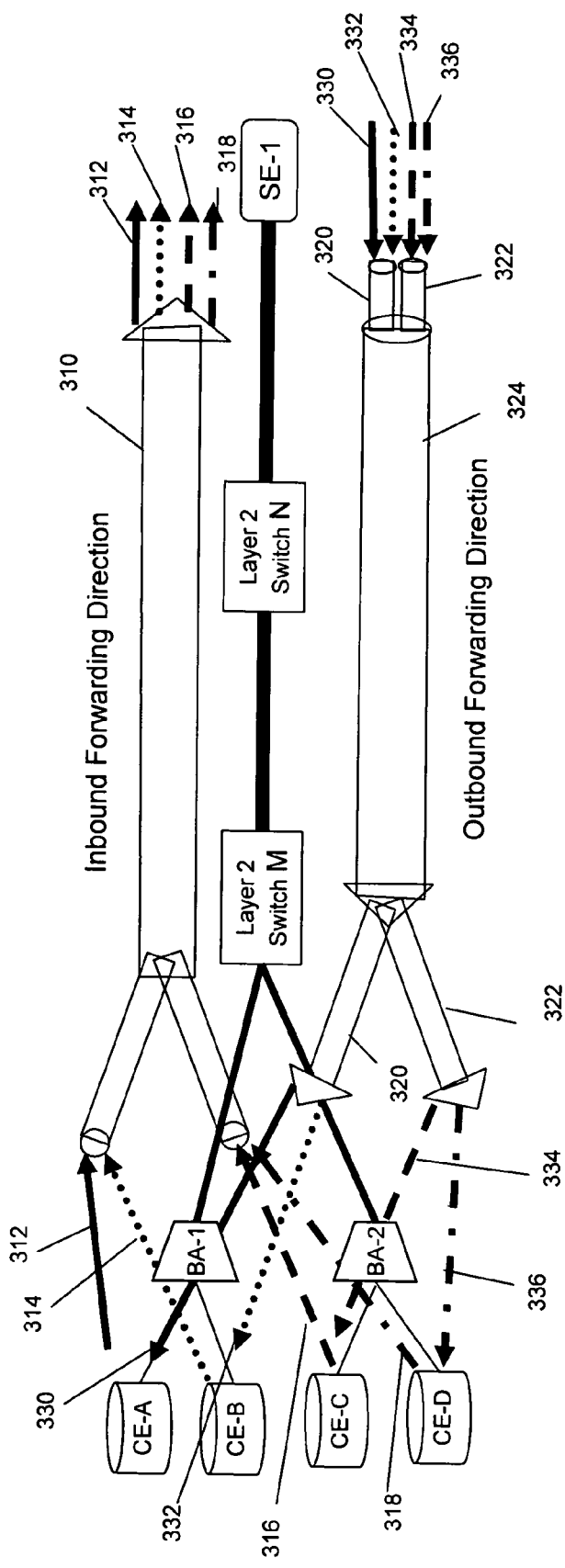
FIG. 3 illustrates inbound and outbound carrier-tagged paths in accordance with an embodiment of the present invention.

FIG. 3 illustrates inbound and outbound carrier-tagged paths in accordance with an embodiment of the present invention. FIG. 3 shows customer edges CE-A and CE-B communicatively coupled to building aggregator BA-1 and customer edges CE-C and CE-D communicatively coupled to building aggregator BA-2. The building aggregators BA-1 and BA-2 are in turn communicatively coupled to layer 2 switch M. In this example, there is no direct connection between layer 2 switch M and service edge SE-1. Rather, a transit layer 2 switch N communicatively couples layer 2 switch M to service edge SE-1. Carrier-tagged paths, e.g., MPLS PSN tunnels, are shown as unidirectional pipes, and carrier-tagged paths within carrier-tagged paths, e.g., pseudowires, are shown as lines with different styles to indicate the source and destination.

Accordingly, the inbound forwarding direction is shown by the directed PSN tunnel 310 and imbedded pseudowires 312-318, and the outbound forwarding direction is shown by the directed PSN tunnel 324, imbedded tunnels 320 and 322 corresponding to each of the destination building aggregators BA-1 and BA-2 as well as the imbedded pseudowires 330-336. As stated earlier, there is a MPLS PSN tunnel from layer 2 switch M to each service edge that is shared by all BA's connected to layer 2 switch M. Labeled packets destined for a single service edge from all of the building aggregators attached to layer 2 switch M are merged into the PSN tunnel and forwarded by layer 2 switch N to the specific service edge, e.g., service edge SE-1. This level of PSN tunnel identifies the destination service edge. Alternatively, the layer 2 switch to which the building aggregators are connected may assign the PSN tunnel labels in a manner called proxy forwarding, which also effectively merges traffic from all building aggregators into a single PSN tunnel directed toward a specific service edge.

The merging of PSN tunnels at a layer 2 switch connected to the building aggregators is possible because the layer 2 switches route the communications based upon the destination of the PSN tunnel (e.g., the specific service edge).

Accordingly, traffic engineering may be performed on the inter-layer 2 switch links, and the building aggregator to layer 2 switch links may need little or no traffic engineering.

Nested inside this inbound PSN tunnel are pseudowires, which are shown using different line styles (and numbers) in FIG. 3 to a specific service edge from each of the customer edges attached to a building aggregator that is attached to layer 2 switch M. Specifically, the pseudowires between customer edge CE-A and the service edge SE-1 are shown as a solid line (312 inbound, 330 outbound), the pseudowires between customer edge CE-B and the service edge SE-1 are shown as a dotted line (314 inbound, 332 outbound), the pseudowires between customer edge CE-C and the service edge SE-1 are shown as a dashed line (316 inbound, 334 outbound), and the pseudowires between customer edge CE-D and the service edge SE-1 are shown as a dotted-dashed line (318 inbound, 336 outbound).

The outbound forwarding direction is shown by the directed PSN tunnels and pseudowires below the corresponding devices in FIG. 3. In the outbound direction, there is an outermost PSN tunnel 324 from each service edge to each layer 2 switch used for traffic engineering and identification of the source service edge, shown as the large PSN tunnel from the service edge to layer 2 switch M in FIG. 3. Inside this outermost PSN tunnel may be nested PSN tunnels that the service edge uses to identify forwarding to a specific destination BA (e.g., PSN tunnel 320 for BA-1). This differs from the inbound direction because now instead of merging, a destination specific splitting of packet flows may occur at the last layer 2 switch in the outbound direction. In other words, an additional label may be used to identify the destination building aggregator and hence an additional level of PSN tunnel nesting (or hierarchy) occurs in the outbound direction. Finally, similar to the inbound direction, a pseudowire is established from the service edge to each customer edge CE as shown by a directed arrow with line style (and number) indicating the source-destination pair. Note that the pseudowires destined for customer edges CE-A and CE-B are nested inside the innermost PSN tunnel 320 destined for BA-1 while the pseudowires destined for customer edges CE-C and CE-D are nested inside the innermost PSN tunnel 322 destined for building aggregator BA-2, as an example of the generic hierarchical nesting described earlier.

Figure 4:
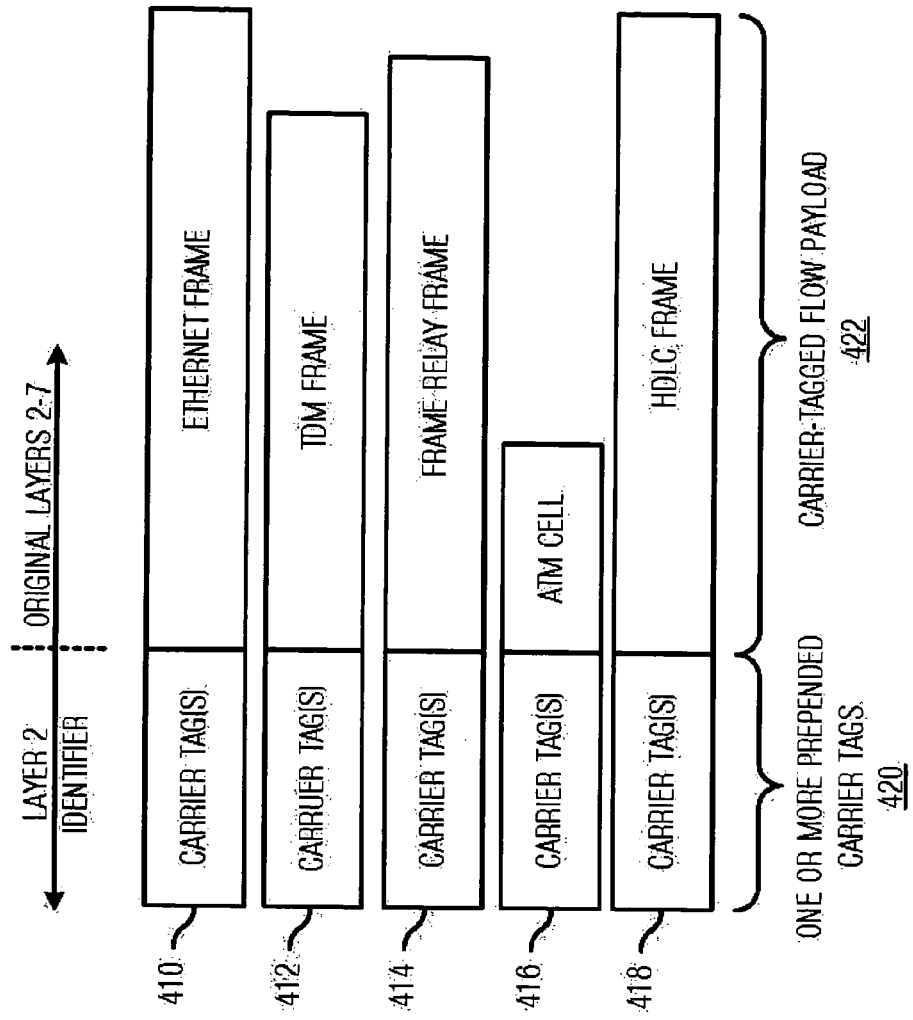
FIG. 4 is a diagram illustrating the use of service emulation in accordance with an embodiment of the present invention.

FIG. 4 is a diagram illustrating the use of carrier tags in accordance with an embodiment of the present invention. Each of messages 410-418 in FIG. 4 have two portions: one or more prepended carrier tags 420 and a carrier-tagged flow payload 422. The carrier-tagged flow payload 422 represents the messages associated with a particular CPE interface, such as an Ethernet frame message 410, a TDM frame message 412, a frame relay frame message 414, an ATM cell message 416, or the like. Other messages, such as a high-level data link control (HDLC) frame 418, an ATM application adaptation layer 5 (AAL5) protocol data unit (PDU), or the like, may also be used. Using the carrier tag 420, new message types may be added incrementally with little or no changes to the layer 2 elements, such as the layer 2 switch 118.

The carrier-tagged flow payload 422 represents the content of the original message as transmitted by or sent to the customer edge. This may include data corresponding to layers 2-7 of the OSI Reference Model. As illustrated in FIG. 4, the carrier-tagged flow payload 422 is kept substantially intact, and the carrier tag 420 is prepended to the carrier-tagged flow payload 422. The carrier tag 420 may comprise, for example, a pseudowire label, a VLAN identifier, a tunnel label, or the like. Multiple carrier tags may be stacked within a message or frame to provide for a hierarchical aggregation and routing mechanism to be implemented in the access network. The same format of the carrier tag 420 may be used for various types of CPE, thereby simplifying the switching requirements within the access network. For example, the switching elements within the access network may simply inspect the carrier tag 420 of messages to determine how the message should be switched or routed.

Furthermore, it should also be noted that in some implementations, it may be desirable to prepend one or more tunnel labels (not shown) to the messages 410-418. A tunnel label allows a PSN tunnel to be established throughout the access network, such as between a building aggregator and a service edge, providing additional scalability throughout the network. This mechanism may be particularly useful when many service emulation instances are to be routed to the same destination or service edge. By assigning the service emulation instances (e.g., psuedowire) to a common PSN tunnel, network elements, such as the layer 2 switch 118, may collectively route the service emulation instances within the PSN tunnel by evaluating the tunnel label. In an exemplary embodiment, the tunnel label is an LSP label prepended to the messages 410-418. In accordance with the present teachings, tunnel labels may also be stacked to any degree needed to support a tunneling hierarchy, which may further facilitate efficient and scalable management of large numbers of flows. It should be noted, however, that stacking may have a practical limit in that the resulting efficiency may be reduced as more labels are stacked, and if a transmission medium supports a Maximum Transfer Unit (MTU) size, a large label stack reduces the size of the payload that can be carried.

Figure 5A:
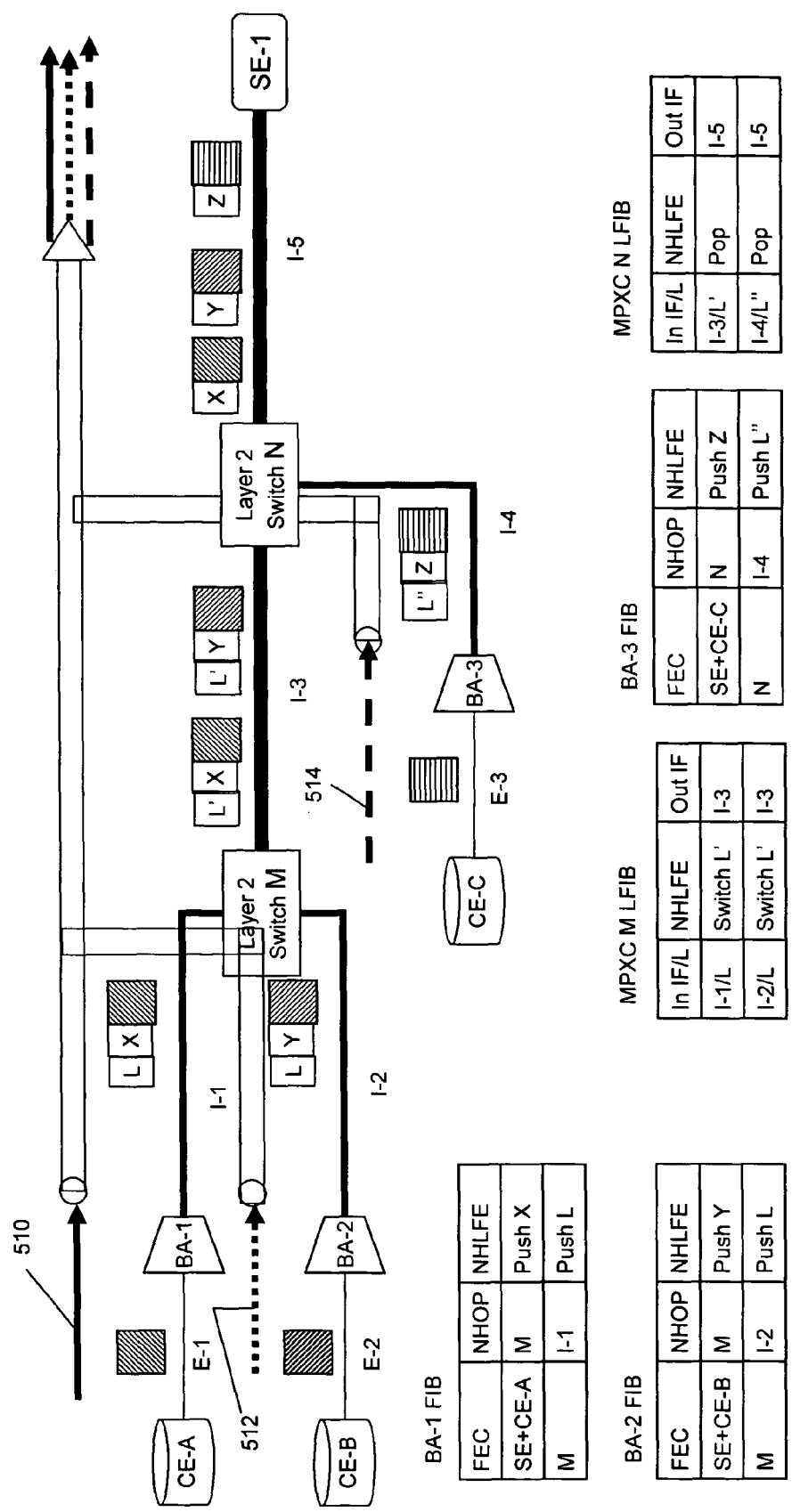
FIGS. 5a and 5b are conceptual views of the use of carrier tags for switching in the direction inbound to the core network in accordance with an embodiment of the present invention.
Figure 5B:
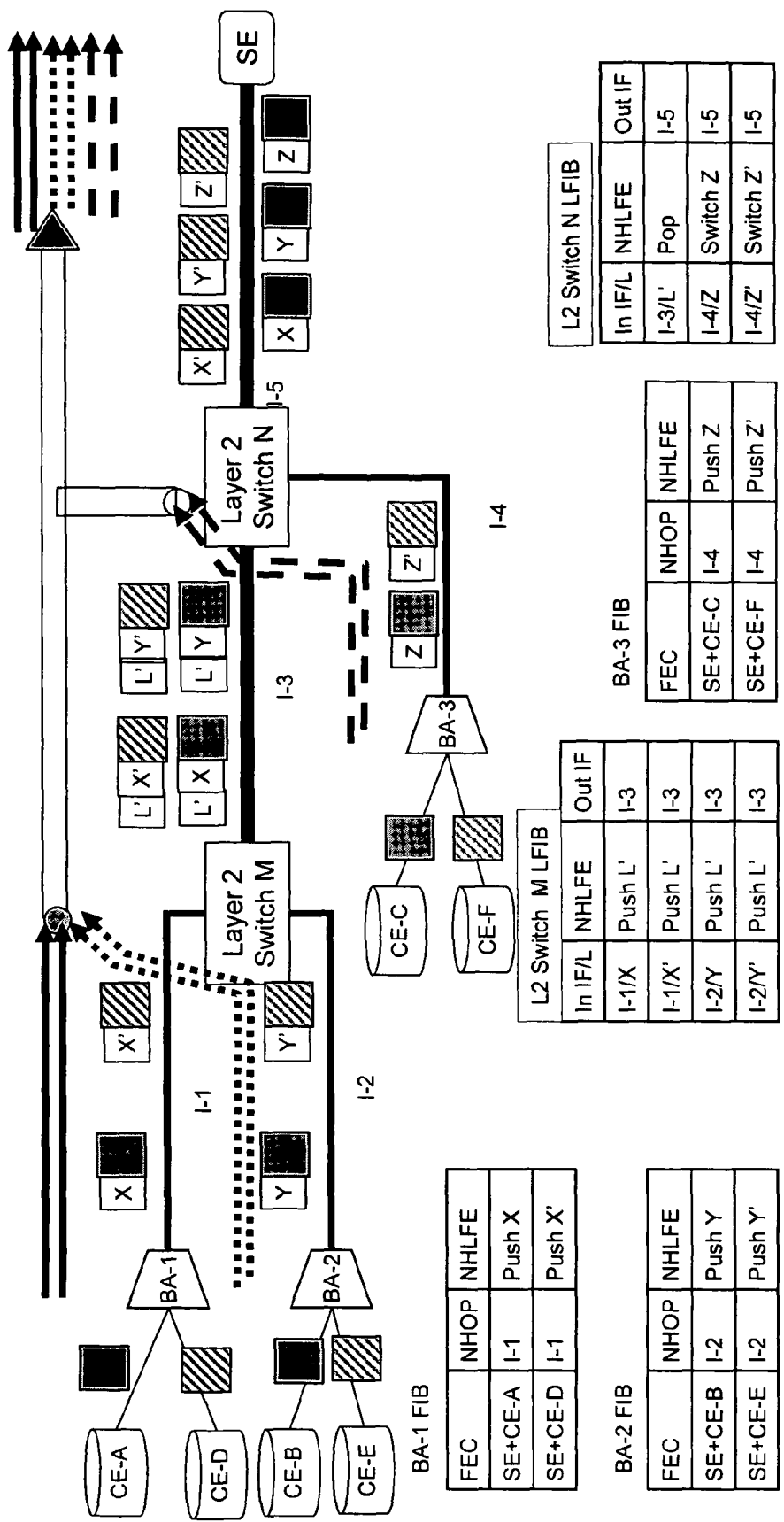

FIG. 5 is a conceptual view of the use of carrier tags for switching in the direction inbound to the core network in accordance with an embodiment of the present invention. The embodiment illustrated in FIG. 5 is provided only as an example of a forwarding plane that may be implemented in accordance with the present invention for the inbound direction from a customer edge to a service edge. Other labeling, switching, and routing techniques may be used.

FIG. 5 shows a label assignment example for the inbound direction from customer edges CE-A, CE-B, and CE-C to service edge SE-1 using a Forwarding Information Base (FIB) that may be used to transmit communications through the access network. Carrier-tagged flows, e.g., packets, from the customer edge are indicated by different line styles wherein CE-A-to-SE carrier-tagged flow 510 is represented by a solid line, CE-B-to-SE-1 carrier-tagged flow 512 is represented by a dotted line, and CE-C-to-SE-1 carrier-tagged flow 514 is represented by a dashed line.

Generally, the building aggregators receive communications from the customer edge. The communications may be either packetized by the customer edge, or the building aggregator may receive TDM communications and packetize the TDM communications for transport through the access network. The carrier tags may be prepended to, switched, or popped from the packets as the packets travel through the access network in accordance with routing instructions.

Packets and carrier tags are indicated by boxes, wherein the text inside the boxes showing the labels that are pre-pended to each customer edge packet at each interface. Boxes without text inside represent packets received from each customer edge. Physical interfaces between customer edges and building aggregators are labeled E-# and other physical interfaces are labeled using the notation 14, where # is a number.

Considering now the packet from customer edge CE-A destined for the service edge SE-1. Building aggregator BA-1 has a Forwarding Information Base (FIB) that has two entries. The first FIB entry for the Forwarding Equivalence Class (FEC) corresponding to the customer edge CE-A-to-service edge SE-1 pseudowire, indicated by "SE+CE-A," which has a next hop of "M" and Next Hop Label Forwarding Entry (NHLFE) of "Push X," wherein "X" represents a pseudowire label. The pseudowire from customer edge CE-A is shown as a solid line 510. The second entry is for FEC "M," corresponding to layer 2 switch M, which has the Next Hop (NHOP) as interface I-1 and an NHLFE of "Push L." The resulting forwarding action for a packet destined to FEC "SE+CE-A" is therefore the combination of the two lookups in the FIB table required to resolve to a physical next hop outgoing interface. The result is that the label stack with label "L" on top (outermost) and label "X" on bottom (innermost) is sent on interface I-1 from building aggregator BA-1 to layer 2 switch M, as shown in the upper left-hand side of the figure.

A similar operation occurs for customer edge CE-B via building aggregator BA-2, with the pseudowire from customer edge CE-B to a service edge SE-1 shown as a dotted line 512. Note that layer 2 switch M merges the labeled packets from all of the building aggregators, e.g., building aggregators BA-1 and BA-2, that layer 2 switch M supports and that have the same destination service edge SE-1. This can be seen from the Label FIB (LFIB) for layer 2 switch M where the rows corresponding to the incoming interface and label (In IF/L) column for the interfaces connected to both building aggregators BA-1 and BA-2 have the same outgoing interface (OUT IF) as the output forwarding physical interface.

Also shown in layer 2 switch M's LFIB is switching the label, potentially to another value to preserve label uniqueness on the outgoing interface or based upon the label assigned by layer 2 switch N (e.g., "L'" as shown) in the NHLFE entry. Note that layer 2 switch N pops (e.g., removes) the outermost label before forwarding to the service edge SE-1 because that label is not needed by the destination service edge SE-1. However, the convention of showing the outermost tunnel pipe is used in the figure because the signaling for this LSP goes to the destination service edge SE-1 as will be described later.

In an embodiment, the penultimate layer 2 switch need not perform a pop operation and the destination would then pop the topmost label before performing any other operation. Thus, the penultimate hop popping action simplifies processing for the destination because it need only process the outermost label of the stack. At the destination service edge, the pseudowire label defines a logical (sub) interface corresponding to a specific customer edge connected via a building aggregator across the access network to the service edge.

A different case may occur for layer 2 switch N that is directly connected to the service edge SE-1. In this case a label may not be needed or desired for switching via intermediate layer 2 switches, but may be necessary to identify the destination service edge. Therefore, building aggregator BA-3 pushes the label "L" to identify the destination service edge, which is merged at layer 2 switch N with packets from other layer 2 switches also destined for this service edge as shown in the upper right-hand corner of FIG. 5. (The pseudowire from customer edge CE-C is shown as dashed line 514.) This means that the forwarding operation by the source building aggregator is identical, independent of the number of intervening layer 2 switches. For example, building aggregators BA-1, BA-2, and BA-3 evaluate their respective FIB in the same manner, regardless of the building aggregator's location in the access network. If layer 2 switch M implements the label imposition function, then there would be only the pseudowire entries in the FIB for the building aggregators and there would be an entry for each pseudowire in layer 2 switch M to push the PSN tunnel label corresponding to the destination service edge.

FIG. 5a illustrates another forwarding design in the inbound direction referred to as proxy PSN forwarding. In this case, the building aggregator need not be aware of the outermost PSN tunnel label. This simplifies the building aggregator, but adds complexity to the layer 2 switch. This example adds another customer edge to each of the BAs to better illustrate the merging of pseudowires and the impact on table sizes, which is a measure of complexity in the building aggregator and layer 2 switch. As can be seen from the figure and the FIB for each of the building aggregators, there is no recursive lookup and each FEC corresponding to a destination. This would halve the number of FIB entries in each of the building aggregators. However, because the layer 2 switch acts as the forwarding proxy for each building aggregator, there may be an entry in the layer 2 switch FIB corresponding to each pseudowire. This means that with proxy PSN forwarding, the layer 2 switch FIB contains a number of entries proportional to the number of pseudowires, as compared with a number of entries proportional to the number of building aggregators when proxy forwarding is not used. Additionally, with PSN proxy forwarding the pseudowire label space may be partitioned and/or mapped between the interconnected devices such that a duplicate pseudowire label cannot be assigned.

Although not necessary, three levels of labels could be used in the inbound direction, namely, a label stack of a source layer 2 switch label, a source building aggregator label, and a pseudo-wire label to be symmetric with the outbound case described below. This could simplify trouble-shooting and diagnostics by making the label stack depth equivalent to that needed in the outbound direction as described below. In this case, the last layer 2 switch (e.g., layer 2 switch N in the above example) would then pop two labels from the top of the stack instead of one, because the pseudowire label would have been uniquely assigned by the destination service edge.

In the descriptions related to FIG. 5 and FIG. 5a, the destination terminating element of the inbound direction was called a service edge. However, the destination terminating element could be a customer edge or a layer 2 switch. When the destination terminating element is a layer 2 switch, that endpoint terminates both the pseudowire and the PSN tunnel.

When the communication is from customer edge to customer edge, and each customer edge is connected to a building aggregator, then there may be a three label stack in order for the destination layer 2 switch to route the packets to the correct destination building aggregator. In this manner, the pseudowire labels are locally unique to the interface label assignment for the destination building aggregator. If proxy forwarding is used, then pseudowire label space may be partitioned across the building aggregators or label value switching may be performed by the layer 2 switch.

If either of the customer edges are directly connected to a layer 2 switch, then at least the following two modes of operation may be used. One method would be to view the layer 2 switch as containing an internal building aggregator and may use the nested PSN tunnel labels to identify the flow as having a local destination. The layer 2 switch receiving the flow may then pop the nested PSN tunnel label and interpret the pseudowire label to determine routing and other functions. This case makes the configuration of the distant end irrelevant to the sender.

An alternative would be to not use a nested tunnel analogous to a building aggregator, and then flows destined for a layer 2 switch directly connected to a customer edge may have a single PSN tunnel label and a pseudowire label.

Figure 6A:
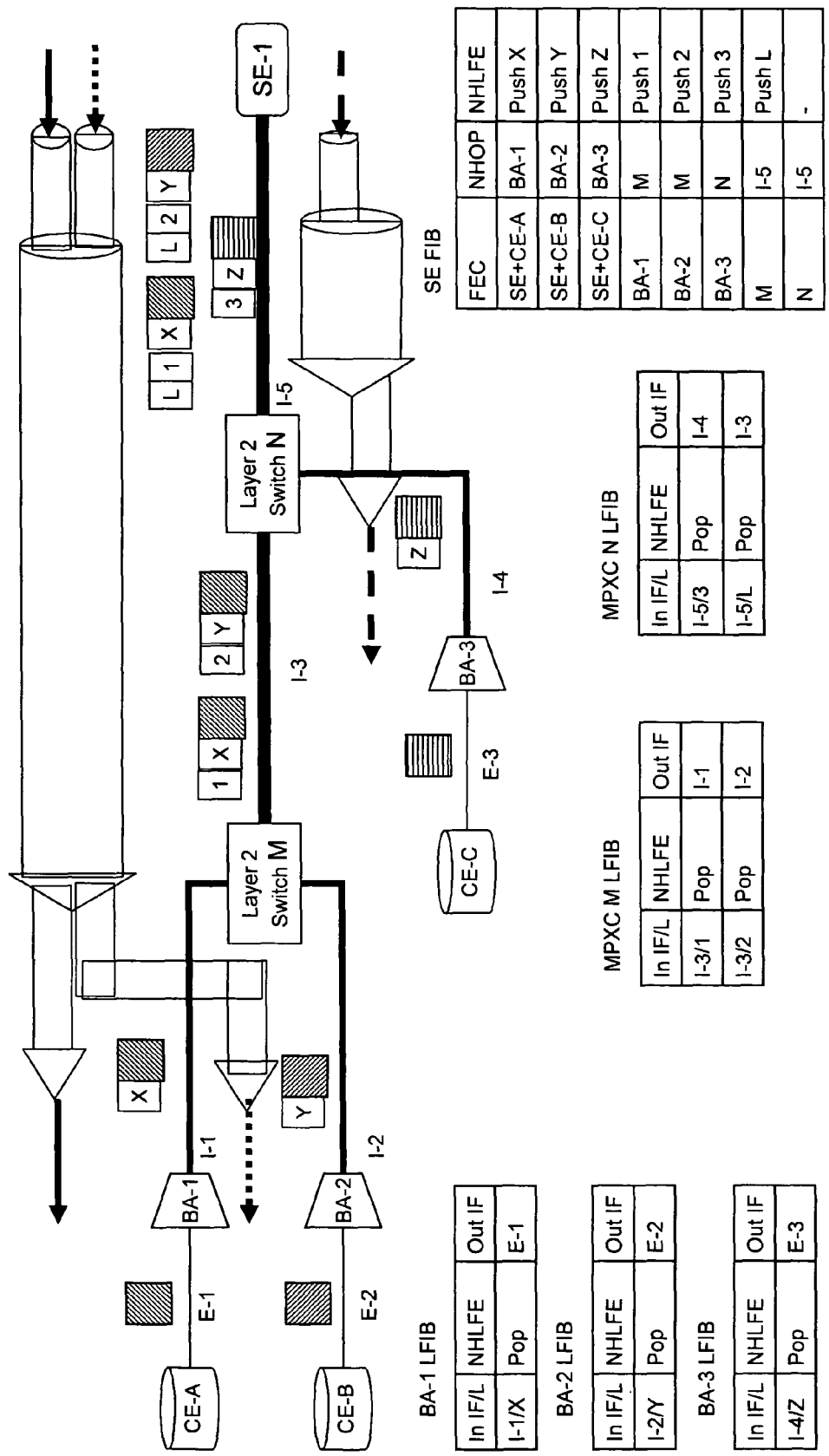
FIGS. 6a-b are conceptual views of the use of carrier tags for switching in the direction outbound from the core network in accordance with an embodiment of the present invention.

FIG. 6 is a conceptual view of the use of carrier tags for switching in the direction outbound from the core network in accordance with an embodiment of the present invention. In particular, FIG. 6 shows a label assignment example for the outbound direction from service edge SE-1 to a customer edge CE-A, CE-B, and CE-C. This example allows for traffic engineering of the MPLS PSN tunnel from the service edge to each of the layer 2 switches and utilizes a three label stack. In this manner, each node may only need to process the outermost label. At the service edge, the outermost PSN tunnel identifies the destination layer 2 switch (note there may be no label if the service edge does penultimate hop popping), the nested PSN tunnel identifies the destination building aggregator, and the innermost label is associated with the pseudowire between the sub-interfaces on the service edge and the customer edge.

Regarding the forwarding from service edge SE to customer edge CE-A, the service edge SE FIB on the right-hand side of the figure indicates that the FEC for SE+CE-A has a next hop (NHOP) of "BA-1" and a NHLFE of "Push X." Resolving the NHOP for "BA-1," i.e., retrieving the entry corresponding to the FEC "BA-1," results in a NHOP of M, which has an NHLFE of "Push 1." Finally, resolving the NHOP for the FEC "M" results in a NHOP of physical interface "I-5" with an NHLFE of "Push L." The forwarding recursion (or indirection) ends when forwarding resolves to a physical interface. The resulting packet destined from service edge SE-1 to customer edge CE-A on interface I-5 has a label stack of "L", "1", and "X" as shown in the upper right-hand corner of the FIG. 6.

The LFIB for layer 2 switch N shows the forwarding at the next hop of popping the outermost label before forwarding on interface I-3 to layer 2 switch M. By convention, the LSP tunnel shown as a pipe in the figure still exists between layer 2 switch N and layer 2 switch M even though there is no label present on this interface as will become clear when the signaling that instantiates this LSP is described below. Finally, the LFIB in layer 2 switch M shows how the outermost label may be used to forward the packet to the destination building aggregator BA-1.

Note that layer 2 switch M pops this last label so that the destination building aggregator BA-1 need only operate on the outermost label, corresponding to the pseudowire. The destination building aggregator BA-1's FIB shows that it pops the pseudowire label and outputs the packet on the destination interface, such as Ethernet interface E-1, which is connected to customer edge CE-A.

Note that if there were other layer 2 switches in the network, then a label different from the value L may be necessary on the service edge SE-1 to layer 2 switch N interface in order for labeled packets to be forwarded to the correct destination. Also, depending upon the specific form of psuedowire implemented, the header of the internal packet may also be modified.

In a manner analogous to the inbound forwarding example, one less label is needed for building aggregators (or customer edges) connected to a layer 2 switch that is immediately adjacent to the service edge, such as layer 2 switch N that is immediately adjacent to service edge SE. In this case, the service edge SE's NHLFE for FEC "N" is null (indicated by a dash), and the other NHLFE operations corresponding to the recursive resolution of the outgoing next hop (NHOP) result in pushing the label stack "3" and "Z", as shown in the upper right-hand corner of FIG. 6. It should be noted, however, that logically there is still a PSN tunnel between the service edge SE-1 and layer 2 switch N as shown by the outermost PSN tunnel in the figure. The signaling of the outermost PSN tunnel may allow for traffic engineering and potentially for fast reroute purposes. Layer 2 switch N uses the outermost label to determine the destination building aggregator, and pops this label before forwarding it as shown in layer 2 switch N's LFIB.

Note that this example uses labels that are unique on any one interface. Although not essential, it is recommended that different label spaces be used for layer 2 switch MPLS PSN tunnels, building aggregators multiplexing values, and pseudowire labels to simplify the design, ease in configuration, and simplify troubleshooting. Alternatively, labels could be made unique on a per platform (e.g., node) basis or throughout the access network.

For a customer edge directly connected to a layer 2 switch (e.g., the building aggregator and layer 2 switch functions are implemented by the same device) immediately adjacent to a service edge, only a single label identifying a pseudowire may be used in the outbound direction. Because the layer 2 switch assigns the label in this case, it can ensure that it is unique either to the interface or the node. However, this case would still be implicitly inside a PSN tunnel between the service edge and the layer 2 switch for traffic engineering purposes.

The concept of proxy PSN forwarding described earlier for the inbound case could also be used in the outbound direction as an alternative embodiment. This may allow the service edge to be unaware of the PSN tunnel and reduce the number of entries in the service edge FIB, but may increase the number of LFIB entries in the layer 2 switch. In this outbound proxy PSN forwarding approach, it is desirable that the labels for the destination building aggregators homed to a particular layer 2 switch be unique across the set of all layer 2 switches in the access network.

In the descriptions related to FIG. 6 the source terminating element of the outbound direction was referred to as a service edge. However, the source terminating element could be a customer edge or a layer 2 switch. When the source terminating element is a layer 2 switch, that endpoint may terminate both the pseudowire and the PSN tunnel stack. In this situation, the above description may be used by replacing the term service edge with layer 2 switch in the figures and descriptions.

When the communication is from customer edge to customer edge, then the functions are symmetric and may use the approach described above.

Figure 6B:
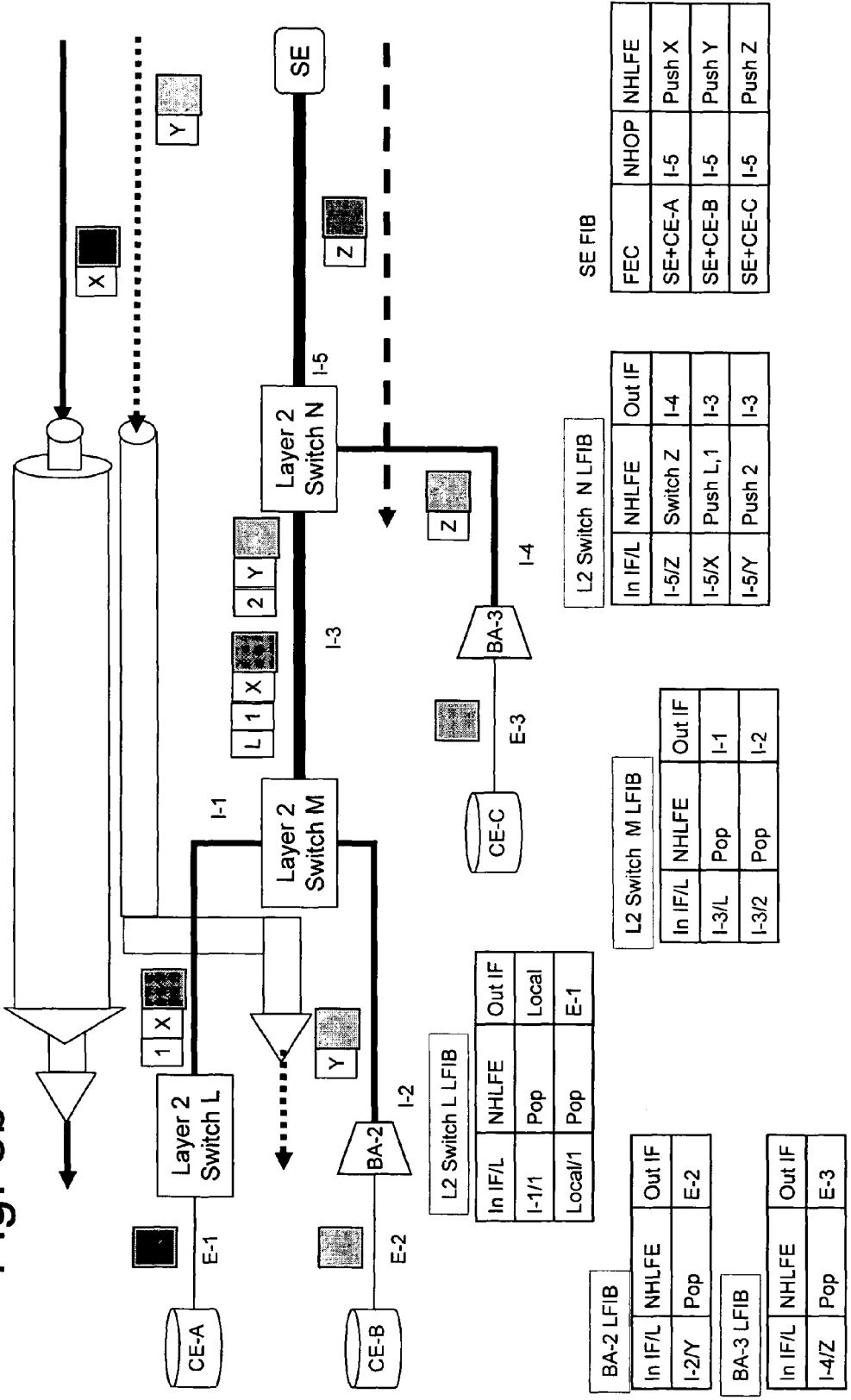

The concept of proxy PSN forwarding described earlier for the inbound case may also be used in the outbound direction as an alternative embodiment. This may allow the service edge to be unaware of the PSN tunnel labels and reduce the number of entries in the service edge FIB, but may increase the number of LFIB entries in the layer 2 switch. FIG. 6*b* illustrates an example of proxy forwarding label assignment for the outbound direction for pseudowires from service edge SE to a customer edges CE-A, CE-B, and CE-C shown by a solid, dotted, and dashed line, respectively. In this manner, each node may route communications based upon the outermost label.

At service edge SE, the outermost label is the pseudowire associated with a sub-interface on service edge SE. Layer 2 switch N acts as a proxy forwarder for the service edge by identifying the destination layer 2 switch and the destination building aggregator, as appropriate. Regarding the forwarding from service edge SE to customer edge CE-A, the service edge SE FIB on the right-hand side of the figure indicates that the FEC for SE+CE-A has a next hop (NHOP) of "I-5" and a NHLFE of "Push X." The forwarding recursion (or indirection) ends when forwarding resolves to a physical interface.

Because NHOP is physical interface I-5, the packet is forwarded with psuedowire label "X" prepended to the packets. The LFIB for layer 2 switch N shows the proxy forwarding at the next hop of pushing the label stack "L,1" before forwarding the packets on interface I-3 to layer 2 switch M. Layer 2 switch M looks up incoming interface/label "I-3/L" and determines that the operation required is to "Pop" and output on interface "I-1."

At layer 2 switch L, the look up on incoming interface/label for "I-1/1" determines the operation "Pop" with output interface "Local." Because a physical interface did not result, forwarding lookup recursion continues and a match occurs for incoming interface/label "Local/1" with resulting operation "Pop" and the packet is output on physical interface E-1.

Regarding the forwarding from service edge SE to customer edge CE-B, the service edge SE FEB on the right-hand side of the figure indicates that the FEC for SE+CE-B has a next hop (NHOP) of "I-5" and a NHLFE of "Push Y." Because NHOP is physical interface I-5, the packet is forwarded with psuedowire label "Y" prepended to the packets. The LFIB for layer 2 switch N shows the proxy forwarding at the next hop of pushing the label stack "2" before forwarding on interface I-3 to layer 2 switch M. Only a single label may be necessary in this situation because an outermost PSN tunnel may not be necessary in this case. Layer 2 switch M looks up incoming interface/label "I-3/2" and determines that the operation required is to "Pop" and output on interface "I-2." At building aggregator BA-2, the look up on incoming interface/label for "I-2/Y" determines the operation "Pop" with output interface "E-2." The packet is then transmitted on interface E-2.

Regarding the forwarding from service edge SE to customer edge CE-C, the service edge SE FIB on the right-hand side of the figure indicates that the FEC for SE+CE-C has a next hop (NHOP) of "I-5" and a NHLFE of "Push Z." Because NHOP is physical interface I-5, the packet is forwarded with psuedowire label "Z" prepended to the packets. The LFIB for layer 2 switch N shows the local pseudowire forwarding Layer 2 switch N looks up incoming interface/label "I-5/Z" and determines that the operation required is to "Pop" and output on interface "I-4." At BA-3, the look up on incoming interface/label for "I-4/Z" determines the operation "Pop" with output interface "E-3." The packet is then transmitted on interface E-3.

An issue with this outbound proxy PSN forwarding approach is that the labels for the destination building aggregators homed to a particular layer 2 switch may need to be unique across the set of all layer 2 switches in the access network. Comparing this with the case where the service edge applies the PSN tunnel labels without a forwarding proxy, the labels for the tunnels to reach a specific building aggregator may be uniquely assigned by each layer 2 switch.

Figure 7:
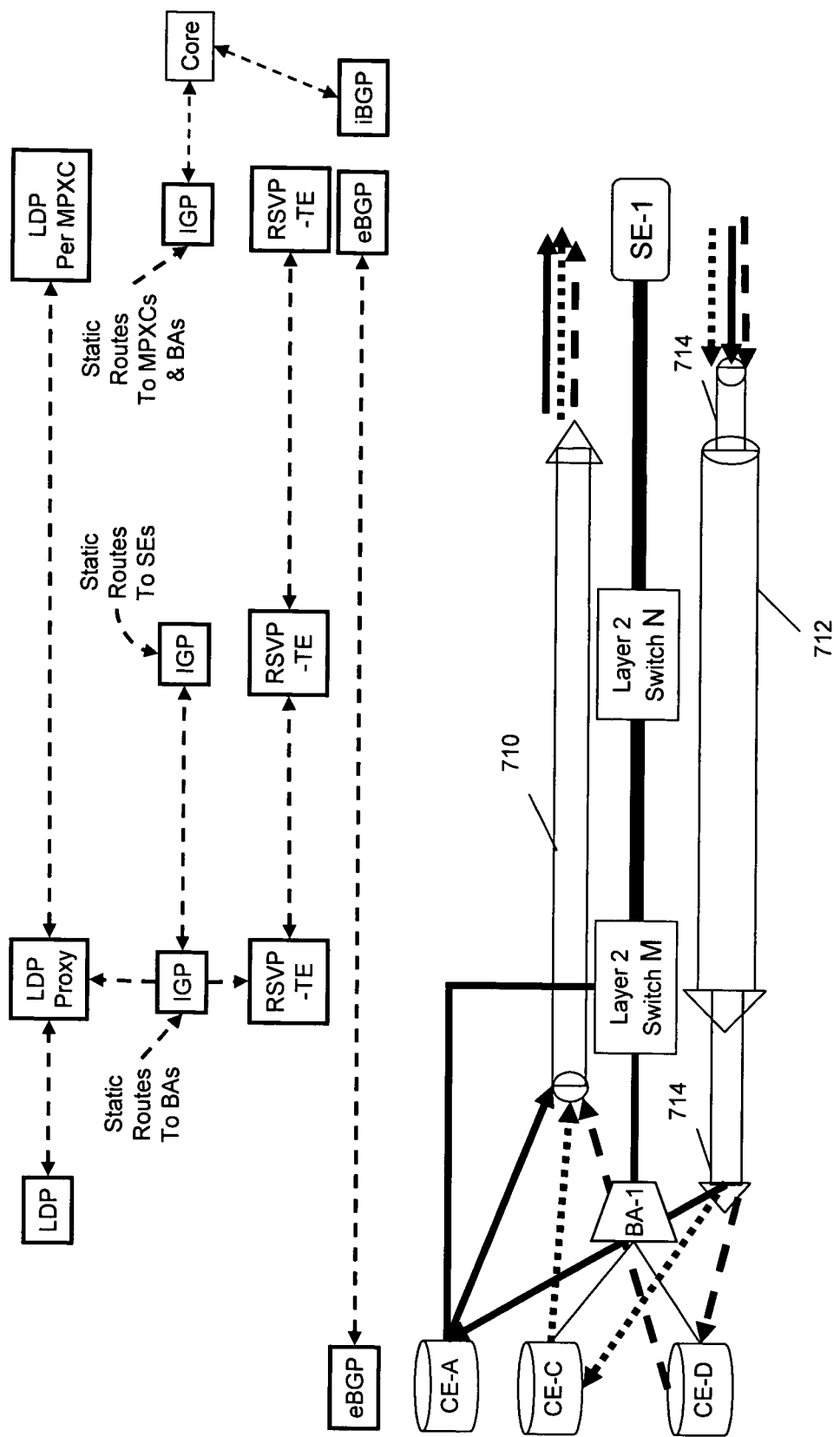
FIG. 7 illustrates a distributed control plane in accordance with an embodiment of the present invention.

FIG. 7 illustrates a distributed control plane in accordance with an embodiment of the present invention. The distributed control plane described herein provides automation of the functions, interfaces, and protocols needed to establish, maintain, and support layer 2 forwarding across an access network in support of access to other services and/or native connections between customers. The approach discussed herein uses, and extends, IETF's Pseudo-Wire Edge-to-Edge Emulation (PWE3) and MPLS PSN tunnels along with automated signaling and routing, and standard MIBs to reduce complexity and achieve vendor interoperability. The relevant protocols and approaches are described in the IETF's Internet Draft entitled "Requirements for Pseudo-Wire Edge-to-Edge (PWE3)" (file "draft-ietf-pwe3-requirements-08.txt") and IETF's Internet Draft entitled "Pseudowire Setup and Maintenance using LDP" (file "draft-ietf-pwe3-control-protocol-06.txt"), which are incorporated by reference. In an embodiment of the present invention, these architectures may be extended as described herein to provide the control functionality described.

The implementation of the control protocols may be native to the equipment, or performed in a separate system. If implemented in a separate system, then the interface to the network element could use a standards-based or proprietary protocol to achieve the goal of interoperability.

The following describes the distributed approach in which the control plane functions are implemented by the various network elements as illustrated in FIG. 7. The forwarding protocol plane is expanded in the lower portion of FIG. 7 to better illustrate that MPLS PSN tunnels, such as PSN tunnels 710, 712, and 714 and a pseudowires, illustrated by solid, dashed, and dotted directional lines, signaling is unidirectional in nature to relate this description to the previous detailed description of the forwarding plane for the inbound and outbound directions. The upper part of FIG. 7 illustrates a potential assignment of control protocol functions to each network element.

One objective is to keep the building aggregator as simple and inexpensive as possible, and as seen from FIG. 7, it only implements the Label Distribution Protocol (LDP) in support of pseudo-wire establishment. In order to keep the building aggregator simple and have a reasonable number of LDP sessions on a service edge, the layer 2 switch may implement an LDP proxy signaling function on behalf of the building aggregators connected to it, such as building aggregator BA-1 in FIG. 7. In an embodiment, LDP is extended to behave as proxy signaling as detailed below. Finally, each service edge may have an LDP session with each layer 2 switch in the metro area. In this embodiment, an LDP session is not necessary between each service edge and building aggregator, thereby reducing the number of LDP sessions in the service edge.

Also shown are some of the interactions at the service edge with the core network as motivation for containing the complexity of the service edge functionality. In other words, LDP may be used to establish the unidirectional pseudowires between a building aggregator and a service edge to provide access to a specific service with the layer 2 switch acting as an LDP signaling proxy on behalf of the building aggregator.

The additional protocols in a layer 2 switch (or a separate control system for it, as described earlier) are necessary to establish and manage the MPLS PSN tunnels, provide management and diagnostic functions, and support LDP signaling message routing. Generally, the following sequence of operations is an order in which these control protocols operate in an embodiment of the present invention. First, the static routes may be configured or dynamic routing occurs and the Interior Gateway Protocol (IGP) converges such that the service edge SE, layer 2 switch N and M, and building aggregator BA-1 can exchange control messages. Second, the service edge SE and layer 2 switch N and M use the Resource Reservation Protocol-Traffic Engineering (RSVP-TE) (or Constraint Routed LDP (CR-LDP)) signaling protocol to establish an outermost traffic engineering MPLS PSN tunnel in the inbound and outbound directions. Next, in the outbound direction, the service edge SE and the layer 2 switch N and M proxy establish the building aggregator multiplexing nested tunnel using LDP. Finally, the pseudowires are established in the inbound and outbound direction between building aggregator BA-1 and service edge SE using the layer 2 switch LDP signaling proxy to establish forwarding between a sub-interface on a customer edge to building aggregator physical interface and a sub-interface on an layer 2 switch to service edge physical interface. These steps are discussed in greater detail below.

In an embodiment in which an IP-based network is used, an Interior Gateway Protocol (IGP), such as Open Shortest Path First (OSPF) or Intermediate System to Intermediate System (IS-IS), determines link state, distributes topology information, and determines the path to reach IP addressable entities for the purposes of control signaling within the domain of that IGP. It should be noted that the IGP of the access network is not generally part of the IGP of any service network and, therefore, can provide access to a number of otherwise independent (e.g., having a separate IGP) service networks. This allows easier scalability of IGP and reduces coupling between these networks to increase stability and decrease the risk of fate sharing. However, IP reachability between the access network and each service edge is necessary for control messages, such as LDP and RSVP-TE messages, management, and diagnostic message exchange. IP reachability may be achieved by establishing a lookup table (e.g., a FIB) with an IP address of a building aggregator, layer 2 switch, or service edge as the FEC and determining the outgoing physical interface.

IP reachability may be accomplished by configuration of static routes at the layer 2 switch and each service edge as indicated in FIG. 6, or by use of some other routing protocol to advertise such reachability, such as Border Gateway Protocol (BGP) or Routing Information Protocol (RIP). As shown in the figure, the layer 2 switch has a static route to all building aggregators for which it acts as a signaling proxy. For example, the layer 2 switch and subtending building aggregators could all be assigned as part of the same IP subnet. Similarly, the layer 2 switches know how to route control messages to the service edges. This could be accomplished by assigning the layer 2 switch as the designated gateway router for reaching all non-local addresses. Accordingly, the layer 2 switches that are physically connected to a service edge would be configured with a static route to a service edge control processor (e.g., to a loopback address). Finally, the interfaces on service edges connected to a layer 2 switch may be configured with the prefix(es) of the layer 2 switches and building aggregators to which it needs to exchange control messages. By these or other configuration and/or routing message interchange, control message reachability can be established.

In an embodiment, the layer 2 switch and building aggregator IP address assignments are contained within the same or larger subnet (or, equivalently the same shorter prefix), but this condition is not necessary. Also, the IP addresses of the layer 2 switch, building aggregator, and the service edge control processors may or may not be public. Routable IP addresses may instead be private IP addresses as defined in IETF's Request For Comment (RFC) 1918, which is incorporated herein by reference, or non-unique IP addresses that are not reachable from the Internet for security and isolation purposes.

Once the static routes have been configured and the IGP has converged, the establishment of PSN tunnels may occur. Because the MPLS PSN tunnels may be routed according to capacity, quality, and affinity constraints (e.g., to avoid shared failure risks), another signaling protocol, such as RSVP-TE from IETF's RFC 3209 or CR-LDP from IETF's RFC 3036, which are incorporated herein by reference, may be used on the layer 2 switch (or its control system) and the service edge. Furthermore, MPLS Fast ReRoute (FRR) may be used to rapidly restore the MPLS PSN tunnels across the layer 2 switches in the access network.

In the outbound direction, nested PSN tunnels (e.g., PSN tunnel 714 nested within PSN tunnel 712) may be established on a per building aggregator basis between the layer 2 switch and the service edge to send packets to the identified destination building aggregator. This may be performed using the layer 2 switch LDP proxy. Finally, pseudowire signaling between the service edge SE-1 and the building aggregator BA-1 may be used to set up specific instances of a packet switched connection for access to a specific service.

Once the packet switched access connection is established, other service-specific functions may be performed. For example, a customer edge-to-service edge control protocol exchange using the exterior Border Gateway Protocol (eBGP) is shown to illustrate how the access network elements may not participate in service-related control protocols between a customer edge and a service edge. eBGP from multiple customer edges may be used by the service edge in an interior BGP (iBGP) session with other service edges across a core network to provide a service, such as access to the Internet or a network-based VPN as defined in IETF's RFC 2547, which is incorporated herein by reference. The customer edge may also communicate via LDP or RSVP-TE with the access network elements and the service edge (using the layer 2 switch signaling as a proxy to achieve reasonable scaling) to request changes in one or both directions of the access network connection.

This section provides an example of how MPLS and PW control protocols could be used to achieve the general objectives and automatically install the forwarding described above. These examples cover the inbound and outbound MPLS PSN tunnel and pseudowire establishment.

Figure 8:
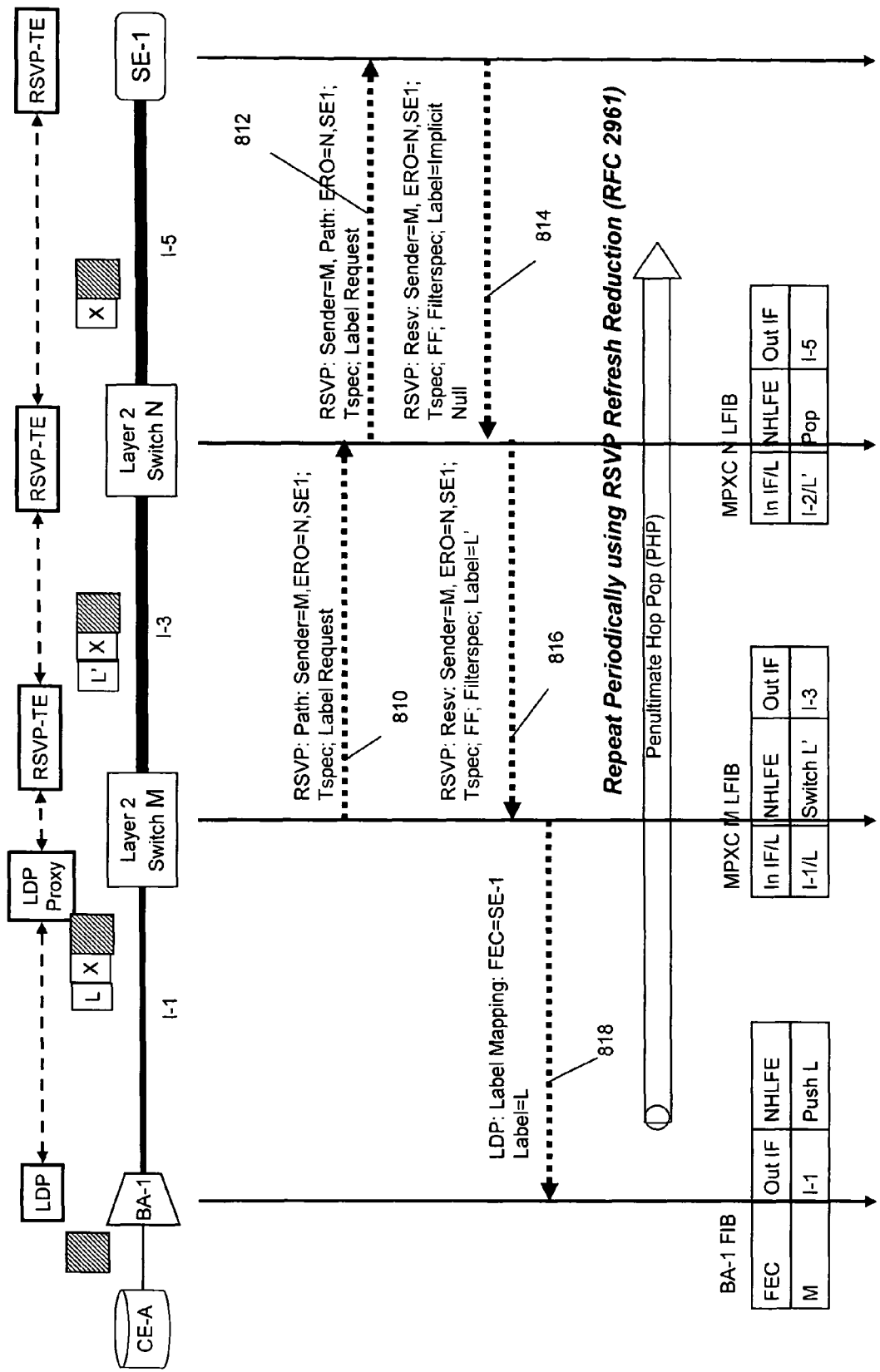
FIG. 8 illustrates the high-level control protocol signaling in the direction inbound to the core network in accordance with an embodiment of the present invention.

FIG. 8 illustrates the high-level control protocol signaling in the direction inbound to the core network in accordance with an embodiment of the present invention. Specifically, the control protocol signaling illustrated in FIG. 8 may be used to establish an inbound MPLS PSN tunnel from building aggregator BA-1 to service edge SE-1. Along the top of figure is an indication of the protocol used between the network elements directly below the protocol. For example, LDP is used between building aggregator BA-1 and layer 2 switch M, wherein layer 2 switch M acts as an LDP signaling proxy, and RSVP-TE is used between the layer 2 switch M, layer 2 switch N, and service edge SE-1. Message flows are indicated as being transmitted between network elements, and the resulting forwarding state for an inbound MPLS PSN tunnel is identified by the FIB or LFIB below the respective elements along the bottom of the figure.

The process begins by configuration of layer 2 switch M to establish a traffic engineered (TE) LSP from between layer 2 switch M and service edge SE-1 which may use the standardized RSVP-TE protocol. Layer 2 switch M transmits RSVP Path messages, such as RSVP Path message 810, identifying itself as the sender and an Explicit Route Object (ERO) identifying the path to service edge SE-1. RSVP uses the concept of receiver-based reservation, which involves the sender first issuing a Path message that identifies the flow and its traffic characteristics. The Path message comprises a session ID, a sender template, a label request, a sender Tspec, and, optionally, an explicit route object. The session ID contains the destination IP address paired with a 16-bit PSN tunnel ID that uniquely identifies an LSP tunnel. Only the ingress LSR need to have knowledge of the FEC assigned to an LSP tunnel, and therefore, unlike LDP, the FEC mapped to the LSP tunnel is not included in any RSVP message. The sender template contains the sender's IP address paired with an LSP ID, which supports a method of make-before-break grooming when changing the path of an LSP tunnel. MPLS may use the controlled load service defined in LETF's RFC 2211, which is incorporated herein by reference, or a null reservation. In a controlled load service, the Traffic spec (referred to as Tspec) uses a peak rate, a token bucket to define the rate and burst size, a minimum policed unit, and a maximum packet size. Layer 2 switch N receives this message and sends it (illustrated by RSVP Path message 814) to the next hop in the ERO, e.g., service edge SE-1.

Once the path message reaches the destination, e.g., service edge SE-1, the receiver responds with an RSVP Resv message, such as RSVP Resv message 814, if it wishes to initiate the label binding requested in the path message. The RSVP Resv message 814 traverses the same hop-by-hop sequence of nodes as the path message in the reverse direction based upon previous hop information communicated in the RSVP Path message. It may also include the session ID from the corresponding path message, an optional route record object, and reservation style-dependent information. The fixed filter (FF) style has a label and Tspec assigned to each sender-receiver pair. The shared explicit style assigns a different label to each sender, but they all may explicitly share the same flow spec reservation. The route record object captures the actual route taken by the LSP starting from the egress back toward the ingress. This can be used by a router to pin a loose explicit route to a particular path by copying the recorded route received in an RSVP Resv message into the explicit route object in an RSVP Path message sent in the opposite direction.

The resulting forwarding state is shown at the bottom of the figure for the Forwarding Information Base (FIB) and Label FIB (LFIB). Also the graphics of a directed arrow is used for the LSP, with the resulting label and payload at each hop shown. Layer 2 switch N is the next-to-last (penultimate) hop, and it pops the outermost label before delivering the payload to the service edge SE-1. Because only packets destined to the service edge SE-1 are sent to service edge SE-1 the outermost label is not needed.

In an embodiment, the LSP signaling is extended to the building aggregator BA-1, which is not covered by the standard application of RSVP-TE described above because building aggregators may not support RSVP-TE to simplify their operation and minimize their cost. Instead, the supporting layer 2 switch proxy translates the label assignment to a down-stream unsolicited LDP command to assign that label to every building aggregator that is connected to that layer 2 switch. Thus, layer 2 switch M performs a label merge for all building aggregators connected to it. Accordingly, only one MPLS PSN tunnel is needed from each layer 2 switch to each service edge.

Alternatively, if layer 2 switch M implements PSN proxy forwarding in the inbound direction, the LDP signaling proxy at layer 2 switch M will not signal a PSN tunnel label to building aggregator BA-1 and instead install an entry in its LFIB for each pseudowire signaled with building aggregator BA-1 to push the PSN tunnel label on behalf of building aggregator BA-1. However, either the pseudowire labels should be split up between the service edges and BAs that may be interconnected, or the LDP signaling proxy should ensure at least interface level unique pseudowire labels result and switch these pseudowire labels to that signaled by the source in the FIB. This may be another entry in the FIB in addition to the label push operation.

A benefit of either the direct or proxy forwarding approach is that the number of inbound PSN tunnels is proportional to the number of layer 2 switches rather than the number of building aggregators. Additionally, each PSN tunnel is larger and spare capacity can be allocated to these PSN tunnels. Having a smaller number of such PSN tunnels also greatly simplifies the implementation of Fast ReRoute (FRR) in the access network. As described earlier, this label is also necessary to distinguish packets destined to different service edges. Fewer or additional carrier tagged paths may be established to better implement a particular implementation.

As illustrated in FIG. 8, the process of generating a Path message and the corresponding Resv message response may be refreshed periodically, nominally once every 30 seconds. The refresh approach accounts for lost messages and, in the case of hop-by-hop routing, automatically moves the reservation to a new path in the event of any change in IP routing. The processing for an initial Path and Resv messages may be greater than the processing for refreshing the state of a previously received message. However, for a large number of LSPs, refresh processing may have a significant performance impact. Furthermore, because refresh handles RSVP message loss, there can be a significant lag in recovering state in the event of a lost message. Accordingly, an RSVP Refresh Reduction process as described in IETF's RFC 2961, which is incorporated herein by reference, may be performed to reduce processor scaling and signaling lag problems. The mechanisms specified include a message bundling to reduce processor load, as well as a means for a router to more readily identify an unchanged message. Also, message acknowledgement is added, which makes RSVP message transport reliable and handles the case of lost Path or Resv tear messages that are not refreshed in normal RSVP operation. Finally, the solution specifies a summary message that refreshes state without requiring transmission of the entire refresh message. These changes have addressed the issues of RSVP refresh overhead in deployed real real-world MPLS networks.

Figure 9:
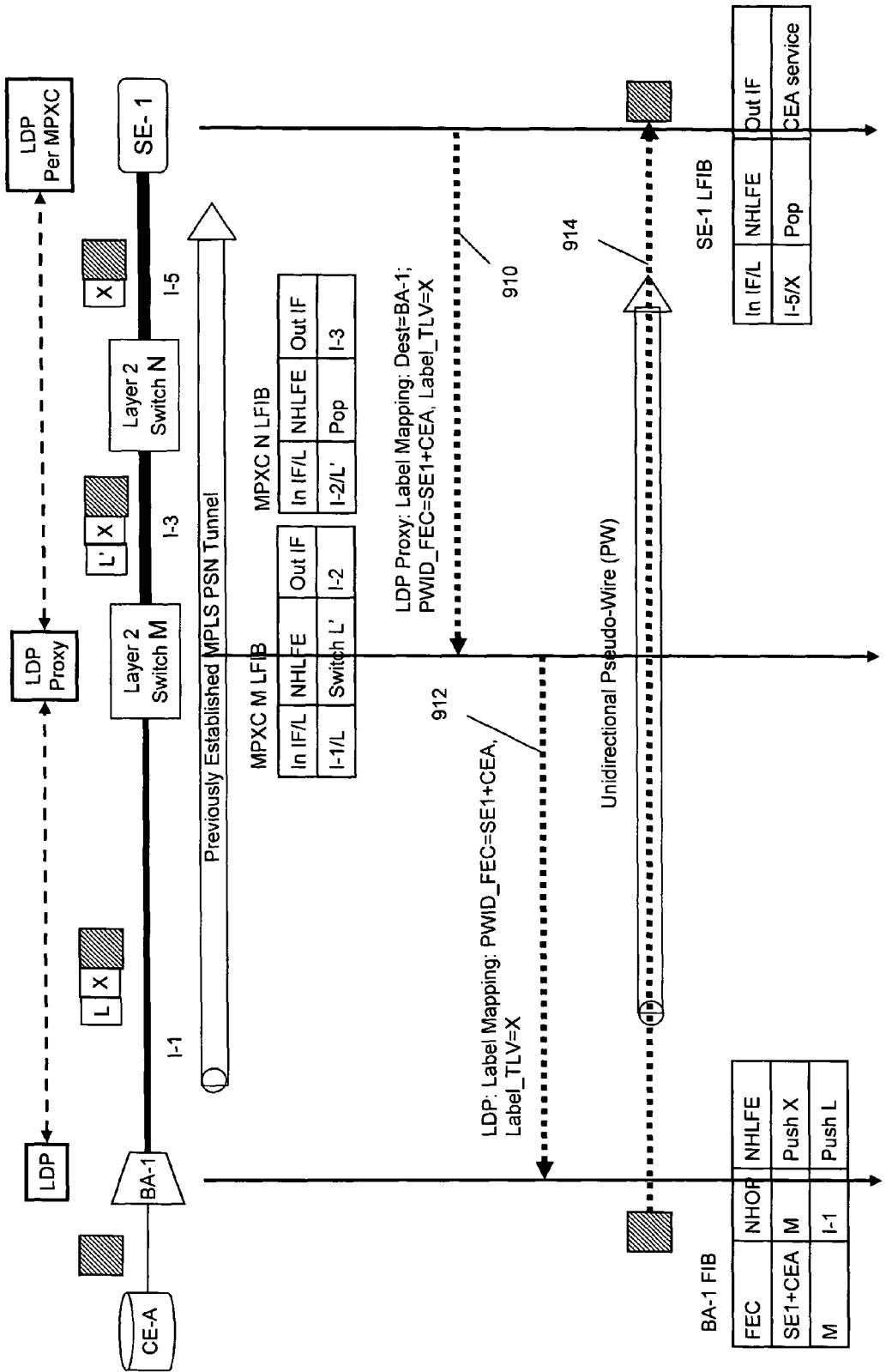
FIG. 9 illustrates the inbound signaling of a uni-directional pseudowire in accordance with an embodiment of the present invention.

FIG. 9 illustrates the inbound signaling of a uni-directional pseudowire in accordance with an embodiment of the present invention. In this case, the pseudowire is established from building aggregator BA-1 to service edge SE-1 over a previously established MPLS PSN tunnel, which may be shared across all building aggregators connected to layer 2 switch M. The generalized pseudowire FEC comprising an Access Group Identifier (AGI) and Attachment Individual Identifier (AII) from section 5.2.1 of IETF's Internet Draft entitled "Pseudowire Setup and Maintenance using LDP" (file "draft-ietf-pwe3-control-protocol-06.txt"), which is incorporated by reference, a 32-bit pseudowire FEC ID, or the like, may be used.

In this example, the service edge SE-1 transmits to the layer 2 switch M (via the layer 2 switch N) an LDP Proxy Label Mapping message 910. The generalized PWID_FEC is a concatenation of the strings for the service edge and the customer edge (e.g., "SE-1+CE-A"). The generalized PWID can carry octet strings of up to 255 octets each for the AGI and AII, and these values may be configured to something meaningful to provisioning systems. Alternatively, the 32-bit pseudowire FEC ID and group ID could be used in a similar manner. The service edge, building aggregator, or layer 2 switch may retrieve additional configuration information based upon a query using (a subset of) the generalized PWID. Because pseudowires use the downstream unsolicited mode of LDP, the service edge sends a label mapping as shown in the right-hand side of the figure for this FEC. It identifies the destination end point of the pseudowire using a non-standard Type-Length-Value (TLV) field called Dest, that is used by the LDP signaling proxy in layer 2 switch M. Non-standard, vendor-private TLVs are supported in section 3.6.1.1 of IETF's RFC 3036, which is incorporated herein by reference, and may be used for non-standard fields in LDP signaling for the access (and other) networks. Alternatively, the value of the proxy signaling source/destination field "Dest" could be standardized.

The assumption is made in this example that the building aggregators are in the same IP subnet as the supporting layer 2 switch such that control message reachability is achieved. Other methods of IP address static route assignment could be used as long as control message reachability is achieved. This method distributes the number of TCP sessions across the layer 2 switches instead of all of the TCP sessions existing in each service edge. This method could also be used to distribute other parameters, such as policing (or rate limiting) parameters to be installed at the building aggregator.

The LDP signaling proxy in layer 2 switch M transmits an LDP Label Mapping message 912 to the building aggregator BA-1. The layer 2 switch M maps the message to standard LDP for communication with the destination building aggregator, e.g., building aggregator BA-1, conveying the same label mapping. Finally, as shown at the bottom of the figure, the FIB in building aggregator BA-1 is configured with the two mappings that result in the label stack "L" and "X" that will deliver packets from customer edge CE-A to service edge SE-1, thereby establishing pseudowire 914. The FIB in service edge SE-1 indicates that packets received with label "X" are associated with a subinterface on that service edge configured in support of the packets from customer edge CE-A for a specific service. There may be a service edge specific to each service type, or the device may be capable of supporting multiple services.

Figure 10:
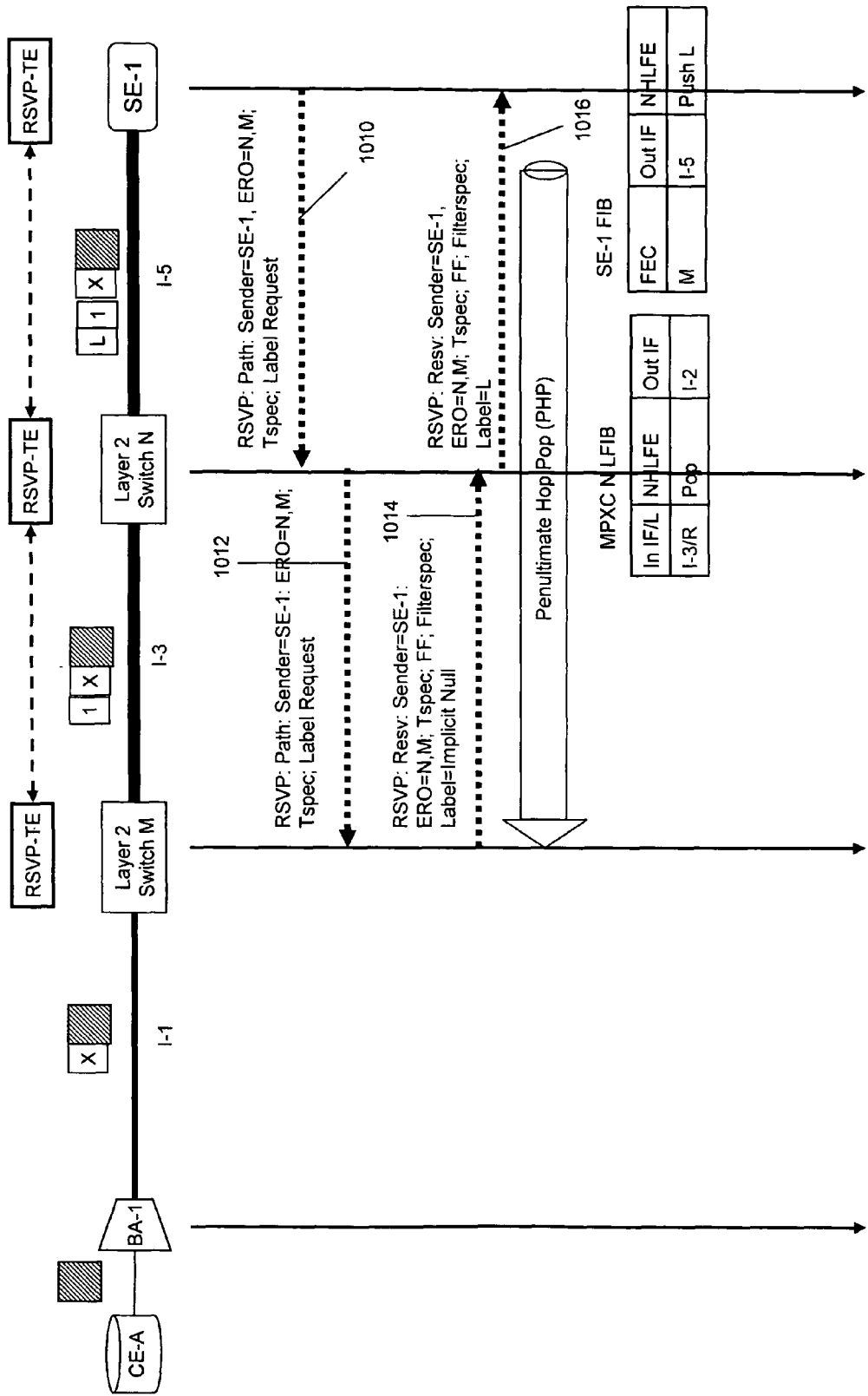
FIG. 10 illustrates control signaling to establish an LSP in the direction outbound from the core network in accordance with one embodiment of the present invention.

FIG. 10 illustrates control signaling to establish an LSP in the direction outbound from the core network in the direction outbound from the core network in accordance with one embodiment of the present invention. As discussed above, the forwarding design of the outbound MPLS PSN tunnel goes from the service edge to the layer 2 switch serving the building aggregator or customer edge. FIG. 10 illustrates the RSVP-TE control signaling that may be used to establish this outbound PSN tunnel between service edge SE-1 and layer 2 switch M.

The process begins by the service edge SE-1 sending an RSVP Path message 1010, indicating the ERO and label request. This request is relayed by layer 2 switch N to layer 2 switch M according to the ERO, as indicated by RSVP Path message 1012. Layer 2 switch M responds with an RSVP reservation (Resv) message 1014 indicating a fixed filter and implicit null label assignment, which layer 2 switch M uses to implement a penultimate hop pop LSP, as shown in the figure. Finally, layer 2 switch N assigns the label L and indicates this in the RSVP Resv message 916 to service edge SE-1. The end result is the SE-1 FIB and layer 2 switch N LFIB shown at the bottom of the figure. Note that generally the MPLS PSN tunnels are established once for all building aggregators, e.g., building aggregator BA-1, and customer edges connected to an layer 2 switch. Using RSVP-TE allows Fast Re-Route (FRR) and non-disruptive grooming.

Alternatively, if PSN proxy forwarding is performed by the layer 2 switch N on behalf of the service edge, then RSVP-TE signaling may not occur between the layer 2 switch N and the service edge. The layer 2 switch N would need to implement LDP proxy signaling on behalf of the service edge as well in order to install entries in its LFIB for each building aggregator destination tunnel signaled by another layer 2 switch. PSN proxy forwarding may reduce the number of FIB entries in the service edge, as described earlier. However, the assignment of building aggregator tunnel labels would have to be partitioned across all layer 2 switches in an access network, or else the LFIB entries in the layer 2 switch adjacent to the service edge would need to have an additional entry for each building aggregator tunnel to ensure that a unique label was used on the interface between the layer 2 switch and the service edge.

Figure 11:
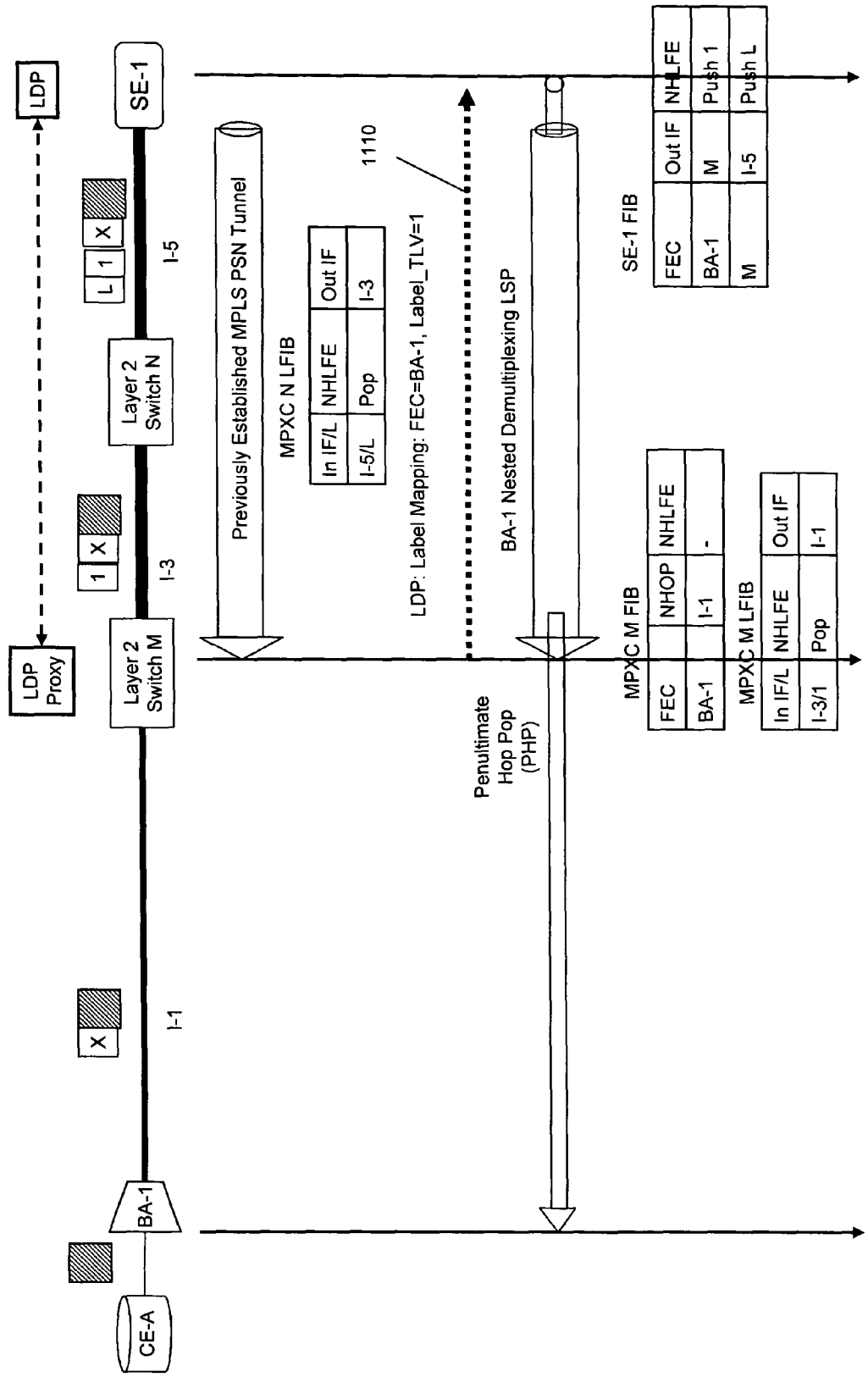
FIG. 11 illustrates signaling that may be performed in the direction outbound from the core network in accordance with an embodiment of the present invention.

FIG. 11 illustrates signaling that may be performed in the direction outbound from the core network in accordance with an embodiment of the present invention. In particular, FIG. 11 illustrates LDP control messages that may be exchanged by network elements to establish a label switched path between a building aggregator BA-1 and a service edge SE-1 via LDP proxy. Because the layer 2 switch N does a penultimate hop pop, the label space used for the destination building aggregators may be different from that of inter-layer 2 switch PSN tunnels for ease of management and troubleshooting. Furthermore, because this is a nested LSP, only a single label mapping message is needed from the source layer 2 switch to the service edge. The layer 2 switch M may ensure label uniqueness because the source layer 2 switch assigns these labels for all building aggregators under its control. This may be accomplished by the layer 2 switch sending an LDP Label Lapping message 1110 that associates a label value (e.g., "1") to the FEC of the destination building aggregator (e.g., building aggregator BA-1). Also shown in the figure is layer 2 switch M FIB entry corresponding to the configured static route associating physical interface 1 (i.e., I-1) with building aggregator BA-1. Because layer 2 switch M is the endpoint of the LSP, it pops the label in its LFIB. The FIB for service edge SE-1 now shows that in order to reach building aggregator BA-1, it performs the next hop label forwarding entry (NHLFE) of push a label with value "1."

Figure 12:
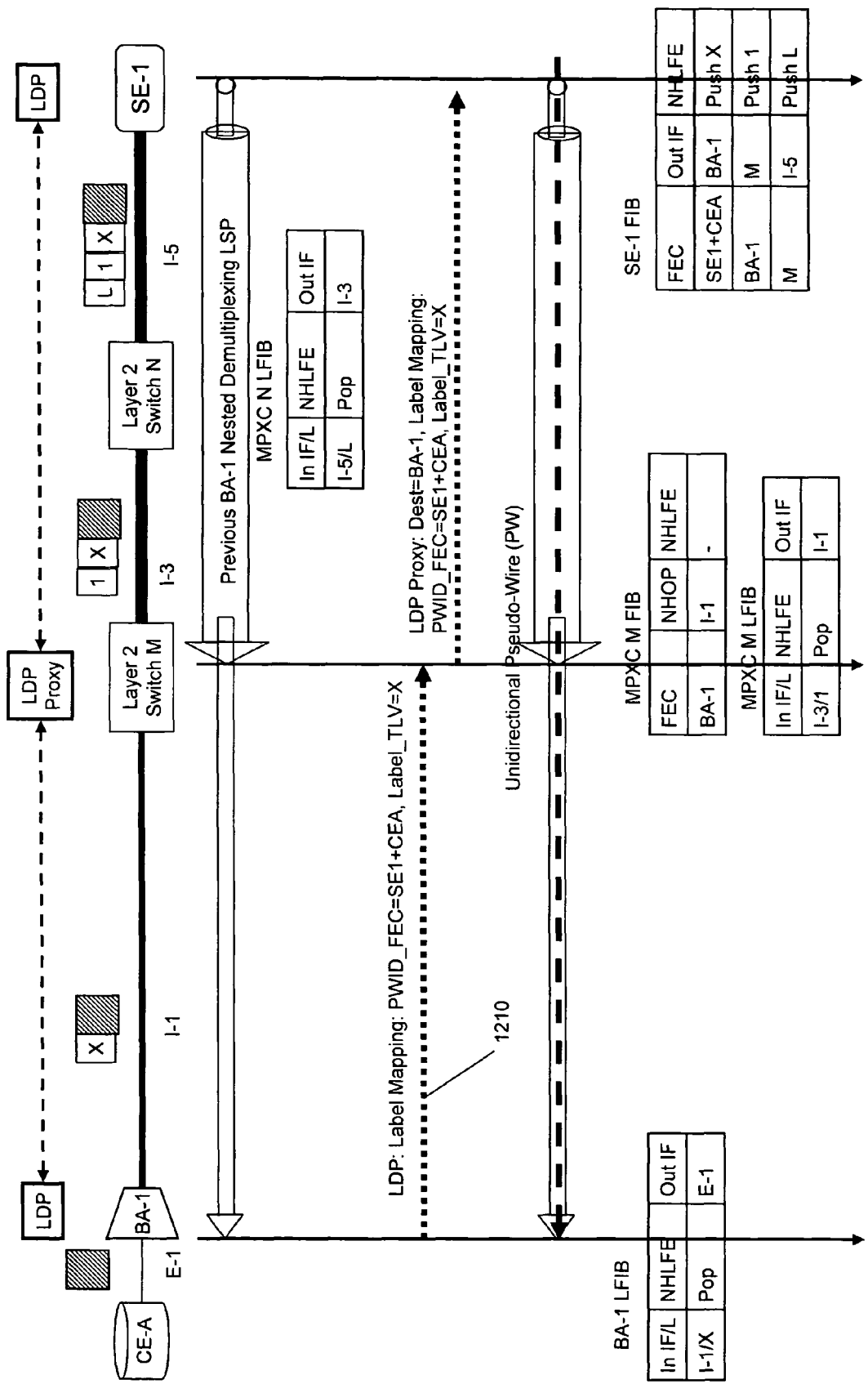
FIG. 12 illustrates establishment of a pseudowire between a service edge and a building aggregator in accordance with an embodiment of the present invention.

FIG. 12 illustrates establishment of a pseudowire between a service edge and a building aggregator in accordance with an embodiment of the present invention. The process begins with building aggregator BA-1 initiating signaling of the pseudowire using an LDP Label Mapping message 1210, which assigns the label value "X" to the PWID_FEC "SE1+ CEA." Note that building aggregator BA-1 installs the forwarding information needed for forwarding packets received with this pseudowire label in its LFIB, as shown in the lower left hand corner of the figure. This may be performed via the LDP signaling proxy in layer 2 switch M, which takes the Label and PWID_FEC TLVs from the message 1210 received from building aggregator BA-1 and places these in a LDP Label Mapping message 1212 sent to service edge SE-1, adding a non-standard field, Dest, identifying the source as building aggregator BA-1 and not itself. Service edge SE-1 installs the assigned label in its FIB as the FEC corresponding to the PWID_FEC using the label "X" as signaled in the LDP message. Inspecting the SE-1 FIB in the lower right-hand corner of the figure, the three labels necessary to forward a packet from service edge SE-1 to customer edge CE-A having the pseudowire label (e.g., "X"), building aggregator destination label (e.g., "1") and MPLS LSP PSN tunnel (e.g., "L") have now all been automatically configured by the action of the above signaling protocols.

There are several provisioning models supported by the pseudowire FEC ID. The model described above is one example in which each direction is established independently, and the FEC ID is used to associate the two directions of the PW. Another model is where the receipt of the LDP message instantiating the pseudowire causes the receiving endpoint to establish the pseudowire by sending an LDP message in the opposite direction. As a result, most pseudowire configuration parameters need only be entered at one end of the pseudowire and the LDP signaling extensions would convey other information. The information conveyed includes not only those defined by a standard, but includes others that can be carried by vendor-private TLVs as defined in section 3.6.1.1 of IETF's RFC 3036, which is incorporated herein by reference.

This results in two cases in which the pseudowire parameters can be provisioned, at the service edge or at the device with the customer interface (e.g., the building aggregator or layer 2 switch). The service edge initiated method may allow a common coordination point for invoking the access establishment and configuring any service-specific parameters. This approach may also allow the service provisioning action to confirm establishment of the access and have reachability to the customer edge or customer premise equipment (CPE) as part of service turnup (e.g., to PING a customer router). The customer-side initiated method may allow distribution of configuration activity to the building aggregators and layer 2 switches with the parameters signaled.

Figure 13:
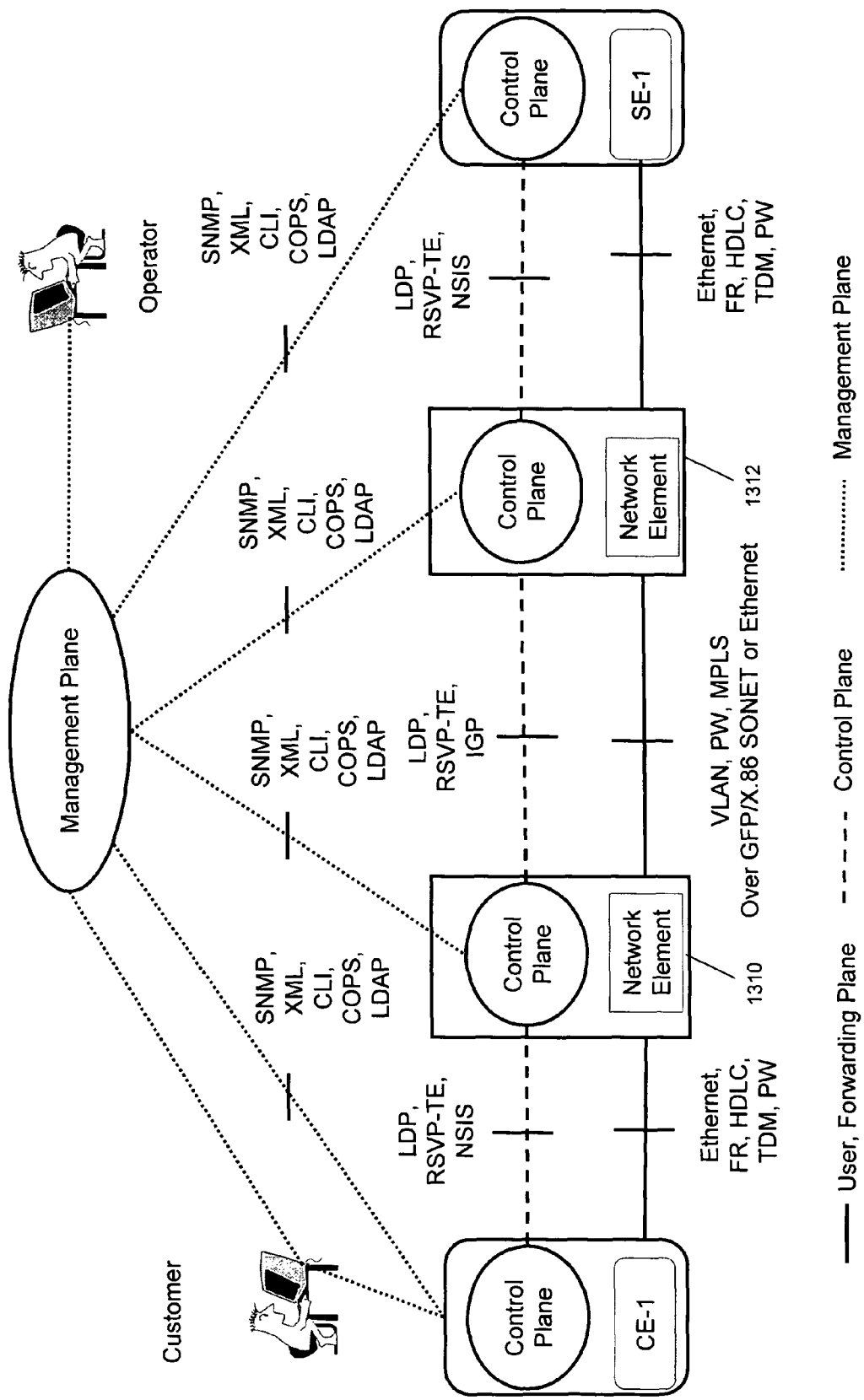
FIG. 13 illustrates a management plane in accordance with an embodiment of the present invention.

FIG. 13 illustrates a management plane in accordance with an embodiment of the present invention. In particular, FIG. 13 shows the interfaces and protocols where control may be distributed to the access network elements, as well as the customer edge and the service edge. The distributed control plan is shown graphically by the circle labeled control plane inside the network elements 1310 and 1312, the customer edge CE-1, and service edge SE-1. The forwarding plane also illustrates services (e.g., FR, HDLC, TDM, PW) that may be emulated, as well as support for a representative set of physical and link layer transmission standards that may be used to interconnect network elements. The case where control plane function is implemented separately from the network element is similar, but in this case there is an additional interface between the control plane implementation and the network element, such as the General Switch Management Protocol (GSMP) as defined by IETF's RFC 3292, which is incorporated herein by reference.

An example of the above approach is manual provisioning of hop-by-hop cross connects where the management plane uses Simple Network Management Protocol (SNMP) or XML to configure a label cross connect, label push, or label pop operation at each node. (Note that a label (e.g., a specific instance of a carrier tag) can be used for a pseudowire or a PSN tunnel.) For example, using the SNMP a set of Management Information Base (MIB) standards may be specified, such as the Ethernet Pseudo Wire Management Information Base (Ma) as described in IETF's Internet Draft entitled "Ethernet Pseudo Wire (PW) Management Information Base" (file "draft-ietf-pwe3-enet-mib-03.txt"), which is incorporated by reference, may be used to configure the parameters of the pseudowire endpoint specific for an emulated Ethernet service. Similar MIBs can be used to provision pseudowires specific to other native services, such as FR, ATM, HDLC, circuit emulation, etc. The pseudowire and MPLS PSN tunnel configuration using the PseudoWire (PW) Management Information Base (MM) as defined in IETF's Internet Draft entitled "Pseudo Wire (PW) Management Information Base" (file "draft-ietf-pwe3-pw-mib-03.txt"), which is incorporated by reference, in conjunction with the PseudoWire MPLS MIB as defined in IETF's Internet Draft entitled "Pseudo Wire (PW) over MPLS PSN Management Information Base" (file "draft-ietf-pwe3-pw-mpls-mib-04.txt"), which is incorporated by reference, may be used to provision such static hop-by-hop cross connects. Other objects in these MIBs can be populated to cause the distributed control signaling to occur as described above. Additional signaled parameters may be configured via extensions to these MIBs, or via some other protocol such as Command Line Interface (CLI) or eXtended Markup Language (XML).

The description above discussed the signaling between access network elements (e.g., building aggregator, layer 2 switch, etc.) and the service edge using either LDP or RSVP-TE. The case where the customer edge could also signal using LDP or RSVP-TE can be extended using the proxy concept in a manner similar to that previously described. Specifically, the layer 2 switch LDP signaling proxy communicates with LDP (or RSVP-TE) on the customer edge, or an LDP signaling proxy could be implemented in the building aggregator on behalf of the customer edge.

Another signaling protocol that may be used is the Next Steps In Signaling (NSIS) standards being specified in the IETF, or other signaling protocols that support a request for resources to be made and enable a signaled response. Another approach described below would be to have the customer, edge signal to some other control plane element, which would then communicate with the layer 2 switch, building aggregator, and service edge as a proxy for the customer edge. This could be used for the customer edge to communicate automatically via signaling to request for change in service, for example, the traffic rate limiting parameter, quality of service, restoration priority, or other service features.

Additional parameters for the pseudowire or the PSN tunnel may also be implemented via adding parameters to the signaling messages. One of particular interest would be to add traffic and QoS class parameters to the pseudowire LDP signaling messages such that the appropriate behavior for configuration of a policer on the building aggregator ingress, configuration of queuing and scheduling on building aggregator egress, configuration of queuing and scheduling on the layer 2 switch-to-service edge egress interface, and configuration of shaping or policing on the layer 2 switch-to-service edge ingress interface is specified. One possible standard for supporting this would be the Constraint Routed extensions to LDP (CR-LDP) as specified in IETF's RFC 3212, which is incorporated herein by reference. Another possible signaling protocol Type Length Value (TLV) object could be that specified in IETF's Internet Draft entitled "QoS Signaling for PW" (file "draft-shah-pwe3-pw-qos-signaling-00.txt"), which is incorporated by reference.

Decisions on whether to honor such a signaling request may occur on the node, or may consult an off-board server via a protocol such as the Common Open Policy Service (COPS). The general method and specific protocol examples for operation of COPS in conjunction with RSVP are described in U.S. Patent Application Publication No. 2002/0194362 A1. The interaction with COPS may be at the device on the edge of the network (e.g., network elements 1310 and 1312) or on the endpoints (e.g., customer edge CE-1 or service edge SE-1). As mentioned earlier, the Lightweight Directory Access Protocol (LDAP) or other protocols could return additional configuration information or a pointer to where and how such information could be retrieved. Other query/response protocols that aid in an admission control decision or return additional configuration information may be used as well. A protocol such as RADIUS may also be implemented between a network element and a server to authenticate a customer edge, a service edge, or other network element.

A pseudowire can be viewed as connecting the two directions of forwarding. The extensions to the Label Distribution Protocol (LDP) described in IETF's Internet Draft entitled "Pseudowire Setup and Maintenance using LDP" (file "draft-ietf-pwe3-control-protocol-06.txt"), which is incorporated by reference, used to setup a pseudowire allows the forwarder at each end to use an attachment identifier (AI) to associate the forwarders at each end together. A 32-bit PWid FEC can serve as the AI, or a more general form of a structured AI of variable length can be supported as follows. Every forwarder in a Provider Edge (PE) (e.g., a pseudowire endpoint) may be associated with a locally unique Attachment Identifier (AI), either through configuration or through some algorithm. Additionally, a set of Forwarders may be defined as being members of a particular group, where pseudowires may only be set up according to policy defined for such groups. For example, pseudowires may be set up amongst members of the same group, or between a set of groups. In this case, the Attachment Identifier (AI) consists of an Attachment Group Identifier (AGI) plus an Attachment Individual Identifier (AII). In the access network design, the Attachment Group Identifier (AGI) could correspond to the service edge and the individual pseudowire may be identified by an Attachment Individual Identifier (AII).

The provisioning procedure begins for one direction of pseudowire interconnection by configuring the source PE with the address of the target PE and a Target AI (TAI). When the target PE receives the Label Mapping message, it interprets the message as a request to set up a pseudowire whose endpoint is the Forwarder identified by the TAI. A PE maps AIs to forwarders using a local convention. Note that the source and target AI need not be identical, but should be mappable based upon certain fields and/or a database query.

The convention for the AIs may be unique to each service type (as distinguished by the AGI), and may contain some service specific information to simplify operations, troubleshooting, and interaction with management systems. For example, the AI may be composed of a string that identifies the physical circuit/port and some logical information meaningful to operations systems and/or personnel. The AI may be, for example, "12345678:Node:xyz:Port:abc:VLAN:49" for Ethernet "VLAN 49" on node "xyz" port "abc" with a physical circuit ID "12345678," an identifier that is meaningful to an operations support system.

If the target PE cannot map the TAI to a local forwarder, then it responds with an LDP Label Release message to the source PE, with a Status Code meaning "invalid TAI." The source PE may generate an alarm and log as an indication of such invalid requests because it is an indication that a potentially customer impacting provisioning error has occurred. Note that a Label Mapping message may also be rejected due to standard LDP error conditions as described in IETF's RFC 3036, which is incorporated herein by reference.

If the Label Mapping Message has a valid TAI, the target PE applies procedures to select the particular type of Forwarder identified by the TAI. This may involve a query to a database (e.g., LDAP) using (a part of) the Target AI and/or Source AI sub-fields. This query may also return additional configuration information for use at either the ingress or egress, for example, policing algorithm parameters, QoS configuration, OAM options, statistics and billing data collection parameters, and other parameters or configuration settings. If the pseudowire signaling extends to the service edge and/or the customer edge, then this lookup may return service-specific parameters as looked up using (a part of) the Target AI and/or Source AI sub-fields. For example, this could return the IP routing and forwarding configuration parameters for a service edge or a customer edge.

If the target PE decides to accept the Label Mapping message, then it has to make sure that an LSP is set up in the opposite direction. If it has already signaled for the corresponding LSP in that direction, nothing more need be done. Otherwise, it may initiate such signaling by sending a Label Mapping message to the source PE. This is very similar to the Label Mapping message it received, but with the SAI and TAI reversed.

FIGS. 14a-14b illustrate a comparison of provisioning methods in accordance with embodiments of the present invention. Management configuration of all network elements from a customer edge to a service edge may be reduced substantially through the use of a distributed control protocol, as illustrated in FIG. 14b. The provisioning of an access connection from customer edge CE-A to service edge SE-1 using a hop-by-hop centrally provisioned approach is shown in FIG. 14a. As can be seen from the figure, the central management systems exchanges messages with not only building aggregator BA-1 to which customer edge CE-A is connected and the destination service edge SE-1, but each intermediate layer 2 switch, such as layer 2 switch M and N, as well. Furthermore, the number of such message exchanges when using standard SNMP for pseudowires and MPLS PSN tunnels may cause significant processing, bandwidth, and storage overhead to network elements.

The amount of messaging can be reduced in the provisioning of an access connection from customer edge CE-A to a service edge SE-1 using a distributed control provisioned approach, as shown in FIG. 14b. In this case, the management system need only provision the endpoints of the access connection, e.g., building aggregator BA-1 and the service edge SE-1 and then control message signaling establishes the connection. Furthermore, the majority of the configuration parameters can be configured at one end of the access connection (e.g., the service edge SE-1) and the control protocol can signal these parameters to the other end. It may be desirable to provision at least some parameters (e.g., the generalized PW ID) at each end to ensure that the control protocol matches the signaling message parameters to the correct physical and logical interface, as described earlier.

Figure 15:
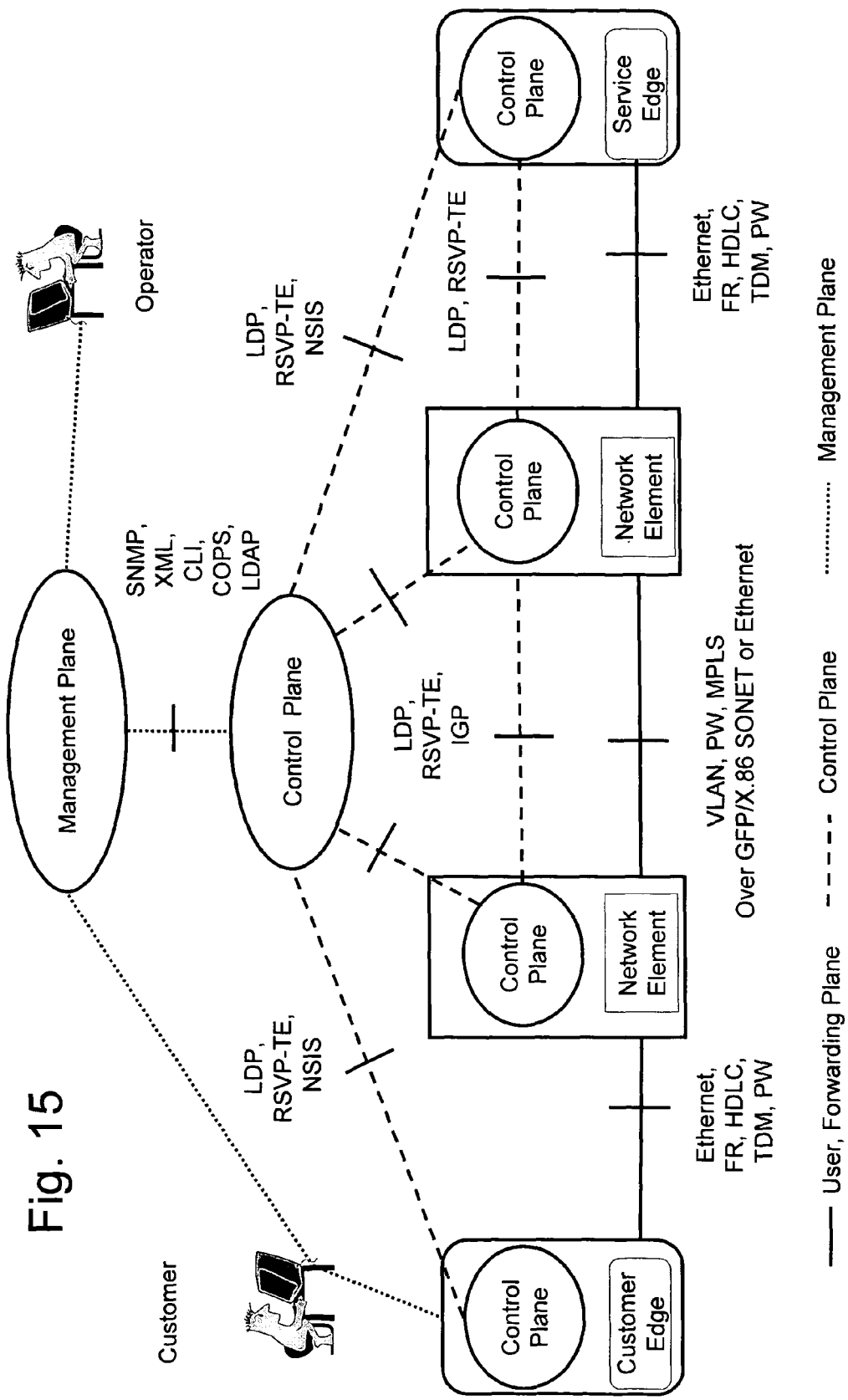
FIG. 15 illustrates a hybrid centralized/distributed control system in accordance with an embodiment of the present invention.

FIG. 15 illustrates a hybrid centralized/distributed control system in accordance with an embodiment of the present invention. The hybrid distributed and centralized control plane approach discussed below uses a control plane where basic routing and signaling functions are implemented by the distributed network elements and may be performed using standard protocols with the extensions described previously. The centralized control plane acts as a signaling proxy on behalf of a customer's management system and/or a service provider's management system. There may be multiple instances in an implementation to achieve high reliability, or instances that only interface to a subset of the customer and service edges and network elements to achieve scalability. When multiple instances are used, it is desirable that the multiple instances intercommunicate to operate as if it were a single, logically-centralized instance. FIG. 15 shows an example of the interfaces and protocols that may be used to implement a hybrid centralized/distributed control within the access network elements in accordance with an embodiment of the present invention.

The SNMP, CLI, or XML protocols traditionally used by management systems may have significant overhead and require multiple message exchanges for provisioning. Therefore, use of SNMP, XML, or CLI may have unacceptable response time and/or connection establishment/modification rates for a specific application if the approach shown using these protocols as the interface between a management plane and the control plane in the customer edge (CE) is used as illustrated in FIG. 13. Accordingly, the approach shown in FIG. 15 allows many of these functions for the interface between the control plane in the customer edge and the control plane in the service provider network to be implemented using more efficient and faster signaling protocols, such as LDP or RSVP-TE. It should be noted, however, that in the configuration illustrated in FIG. 15, not all of the features and policy information need be in the centralized service provider control plane, but may use one or more query/response protocols, such as Common Open Policy Service (COPS), Lightweight Directory Access Protocol (LDAP), or the like, to perform admission control, name/address translation, retrieve additional information or even retrieve specific service logic from the management/service plane.

The centralized control plane can be viewed as an augmentation of the service provider management infrastructure optimized for higher transaction rates and real-time performance. The COPS and LDAP protocols are more transaction and real-time oriented than SNMP, CLI or XML. Alternatively, a higher performance real-time, transaction protocol could be used between the control plane in the customer edge and the control plane in the service provider network. These transaction protocols may be used to make multiple instances of the centralized control plane appear as one single logical function to external interfaces (i.e., customer and service edges).

This hybrid approach utilizes third-party (sometimes called proxy) signaling where the centralized control plane can signal as a proxy for the customer edge control plane. Proxy signaling proxy provides a means for associating Virtual Path Connections (VPCs) on more than one interface with a single control link connecting an external Proxy Signalling Agent (PSA) to a control plane in a network element. Via a pre-configured mapping of VPCs on physical ports to logical VPC Identifiers (VPCI), the PSA can signal for and receive signaling as if it were the end user, appearing simultaneously as many users. This occurs because normally a user signals for Virtual Channel Connections (VCCs) with messages within a VPC on a physical port. In proxy signaling, the PSA uses the VPCI in signaling messages to identify the combination of a VPC and physical port to the switch and can thus appear as more than one user to the switch by specification of more than one VPCI.

In an embodiment, the proxy signaling agent concept extends the individual user (or device) level signaling with an additional piece of information that identifies the user (i.e., logical and physical source or destination) for which the message is proxy in the context of an access network. The proxy signaling agent may issue a message to an access network element that establishes or changes parameters (e.g., traffic levels or QoS) as if it were directly signaled by the customer edge.

In an embodiment, the proxy signaling agent concept may be applied to LDP or RSVP-TE. The network element directs received customer edge and/or service edge control messages to the centralized control plane instead of processing them locally. This may be done by configuration of the customer edge and service edge control plane implementations or by the network element redirecting these messages to the centralized control plane. This allows policy and additional features to be implemented in the centralized control plane that are not implemented in the network elements. Restrictions in some standards and implementations about these devices being physically adjacent may be removed, or alternatively, a PSN tunnel could be implemented between the customer edge and/or service edge and the centralized control plane so that they in fact appear adjacent to the control protocols. Adjacency includes adjacency in the IP sense in that the TTL in the IP header would only decrement by one. The service edge and customer edge signaling sessions may be associated with a physical or logical port on the network element. The address of the service edge or customer edge used in control messages may be unique and could be used as an index into a configured lookup that maps to a physical or logical port. The LDP or RSVP-TE signaling between the centralized control plane and the network element may to be augmented with a field identifying the logical and physical port to which the control messages apply using the proxy signaling agent concept described earlier.

With this infrastructure, a number of enhanced services similar to those developed for telephony can be implemented for signaling of not only access connections, but signaling that could traverse wide area networks as well. These include address translation, tunneling of private addresses within routable addresses, closed user groups, overflow to alternate routes based upon various network conditions, hunt groups, time of day and day of week calling, usage-based billing, guaranteed bandwidth intranets, bandwidth subscription control, change rate control, or the like. The origination of such a signaling request may be from the customer edge, the service edge, or from the centralized control plane, and the signaling may be used to change parameters and need not be used only for creating or releasing a connection. The connection may be for the access network, or may be a wide-area pseudowire as part of a L2 VPN virtual private wire service (VPWS).

Figure 16:
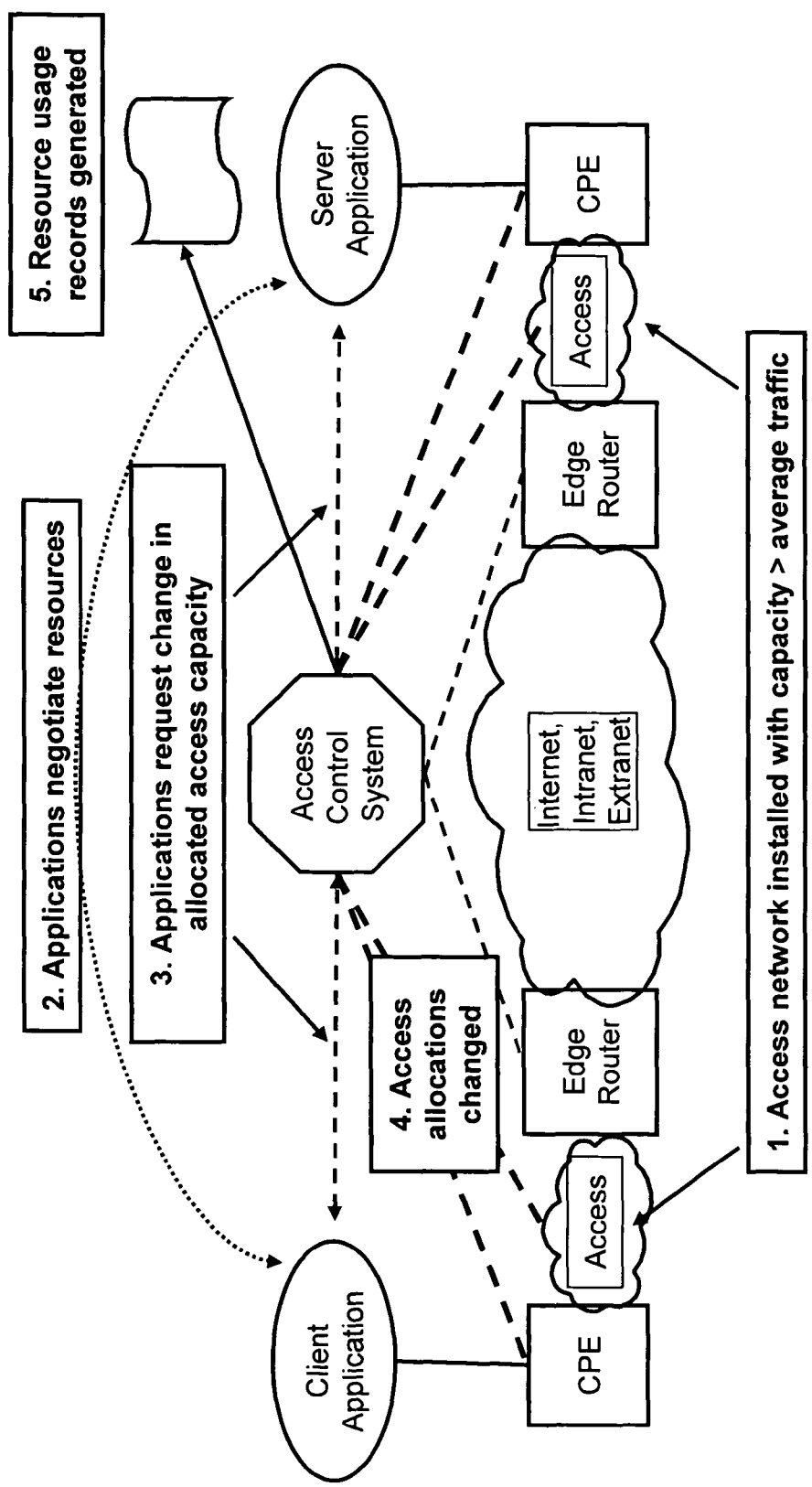
FIG. 16 illustrates dynamic access control in accordance with an embodiment of the present invention.

FIG. 16 illustrates dynamic access control in accordance with an embodiment of the present invention. Dynamic access control allows for dynamic source provisioning and can be supported using a distributed or a hybrid distributed centralized approach. GRID and On-Demand applications may require "bandwidth on demand," in which capacity is modified for a single site, or a set of sites in order for the communication to be useful to the application. For example, a distributed computation related to physics, environment, biology, economics, engineering, medicine, security, and the like may require participation of sites with specific computer processing, application software, databases, telemetry, and/or sensors to all be engaged, each with requisite resources, such as access capacity.

In FIG. 16, an example having two sites, a client and a server, is illustrated. This is extensible to an arbitrary number of sites. In order to increase access capacity, the prerequisite in step 1 is that sufficient physical transmission capacity be in place on the link between the access network and customer premises equipment (CPE). Step 2 involves negotiation between one or more sites regarding requested resources. These resources may include processing power, database access, software, sensors, access network capacity, transit network capacity, and the like. As a result of step 2, the distributed applications have determined the necessary resources, one being access capacity, and they make a request to increase access capacity to an access control system shown in the center of the figure. Such a request may be invokable by a machine-machine or a human-machine interface.

A request to decrease capacity should be honored, except if there is some temporary situation that might delay processing of such a request. In general, these requests may occur asynchronously and be processed independently. However, there may be a field in the request protocol that requires that either all requests can be granted or no request would be honored. Additionally, these requests could be made as a reservation request for some future date and time, in which case the access control system could respond individually or as a grouped set of requests.

Once the access control system has met the conditions of the access capacity increase requests, step 4 begins. Increasing (or decreasing) access capacity requires coordinated changes between the application and network components. The network components may include the CPE, the access network, and the edge router. For example, the following may need to be changed: the scheduler and shaper settings on egress from the CPE toward the access network, the policer/ marker parameters at ingress to the access network, the routing of the access connection (e.g., PW) across the access network, shaping on egress from the access network to the service edge, scheduler and shaper settings on egress from the service edge, policer/marker settings on the ingress of the service edge, or the like.

The access control system may make these changes using signaling of pseudowires and/or through management protocol interfaces described earlier. Once the access network changes are made, the access control system may create resource usage (billing) records and initiate performance monitoring (SLAs) functions for use by IT systems. Once the distributed applications have completed their work and signal this to each other, they are essentially starting the same process over again beginning at step 1, but now making a request to decrease in access capacity, which should usually be successful and would usually result in a final billing record being generated in step 5.

A number of operational and network management functions are also supported by application of the MPLS and pseudowire based protocols to a packet-switched access network. In an embodiment of the present invention, the management functions, such as those described below, assume an IP and MPLS enabled set of network devices (e.g., a building aggregator, a layer 2 switch, or the like).

Furthermore, the building aggregator, layer 2 switch, and service edge may support a MIB supporting transport and encapsulation of L1 and L2 services over any type of PSN and MPLS respectively, creating a pseudowire service. Support for MIB objects that define the generic pseudowire association to the PSN and pseudowire configurations that are not specific to the carried service as defined in IETF's Internet Draft entitled "Pseudo Wire (PW) Management Information Base" (file "draft-ietf-pwe3-pw-mib-03.txt"), which is incorporated by reference. Extensions to this MIB are necessary to support the layer 2 switch proxy function. One additional management object required is association of a physical interface with a specific proxy identifier used in signaling message, for example, the IP loopback address of the building aggregator. Additional configuration objects may be used if more than one proxy alternative (e.g., whether to distribute a PSN tunnel label to a building aggregator or to push a label on behalf of a building aggregator in the inbound direction) is supported, such as to specify which method is to be used in a particular situation.

The building aggregator, layer 2 switch, and service edge may also support a MIB module for pseudowire operation over an MPLS Label Switch Router (LSR) as defined in IETF's Internet Draft entitled "Pseudo Wire (PW) over MPLS PSN Management Information Base" (file "draft-ietf-pwe3-pw-mpls-mib-04.txt"), which is incorporated by reference. Extensions to this MIB are necessary to support the layer 2 switch proxy function in terms of label stacking used to configure an additional nested tunnel for the destination BA in the outbound direction. One additional management object required is association of a physical interface with a specific proxy identifier used in signaling message, for example, the IP loopback address of the BA.

The building aggregator, layer 2 switch, and service edge may also support a generic route-tracing application defined in IETF's RFC 3609, which is incorporated herein by reference, that can discover the forwarding path between two interfaces that are contained by an MPLS network. GMPLS ICMP-based tunnel trace may be supported as defined in IETF's Internet Draft entitled "ICMP Extensions for Multiprotocol Label Switching" (file "draft-bonica-icmp-mpls-02.txt"), which is incorporated by reference, may be implemented for interoperability with major router manufacturers. These tracing procedures would need to be augmented to at least identify the presence of an layer 2 switch proxy.

The building aggregator, layer 2 switch, and service edge may also support Virtual Circuit Connection Verification (VCCV) procedures for use with pseudowire connections as specified in IETF's Internet Draft entitled "Pseudo Wire (PW) Virtual Circuit Connection Verification (VCCV)" (file "draft-ietf-pwe3-vccv-02.txt"), which is incorporated by reference. VCCV makes use of IP based protocols such as Ping and MPLS LSP Ping to perform operations and maintenance functions. This is accomplished by providing an IP control channel associated with each pseudowire. A network operator may use the VCCV procedures to test the network's forwarding plane liveliness. These VC verification procedures need to be extended to include the case of an layer 2 switch proxy.

It should be appreciated that the present invention as described above provides an intermediate level of hierarchy into both the label stacking and nesting of signaling, which may result in improvements over a straightforward application of pseudowires over MPLS PSN tunnels in the access network. For example, the number of MPLS PSN tunnels and signaling sessions at the service edge and across the access network is on the order of the number of layer 2 switches (e.g., tens), rather than on the order of the number of endpoint aggregation devices or building aggregators (e.g., thousands). Furthermore, having the service edge implement the pseudowire endpoint allows multiple types of encapsulation across the building aggregator pseudowire endpoints that can be supported on the same physical layer 2 switch-service edge interface, where currently a separate physical layer 2 switch-service edge interface would be required for Ethernet, FR and ATM. Furthermore, proxy forwarding allows for simplification of endpoints if a more complex configuration and function of the layer 2 switch is acceptable.

FIGS. 17-20 illustrate examples of configurations that may be implemented in accordance with an embodiment of the present invention. Regarding FIG. 17, a pseudowire pair 1710 is shown formed between customer edge 1712 and a terminating element 1714 via a first layer 2 switch 1710 in a single-hop scenario, and a pseudowire pair 1720 is shown formed between customer edge 1722 and a terminating element 1724 via the first layer 2 switch 1710 and a second layer 2 switch 1732 in a double-hop scenario.

Figure 17:
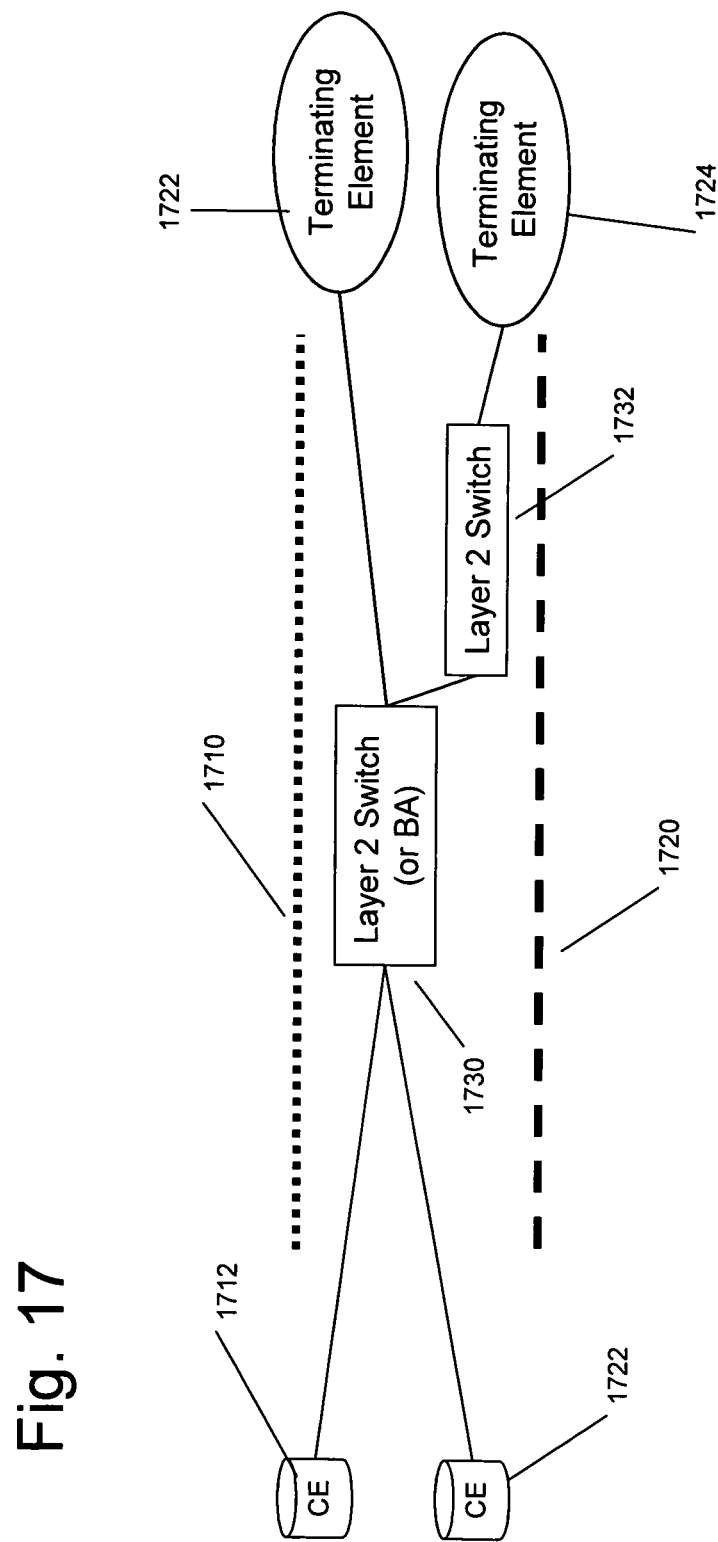
FIGS. 17-20 illustrate examples of configurations that may be implemented in accordance with an embodiment of the present invention.

The upper part of FIG. 17 illustrates the case where a customer edge is directly connected to a layer 2 switch or building aggregator (e.g., via a Gigabit Ethernet interface), and the destination is a terminating element such as another customer edge or a service edge connected to the same layer 2 switch 1710 (or a building aggregator, for example). In this case, there may be no need for a PSN tunnel, because both pseudowire endpoints are on the same device.

The bottom part of FIG. 17 shows the case where there are two switching nodes between a customer edge 1722 and another terminating element 1722, such as another customer edge or a service edge. In this case, a PSN tunnel may not be necessary between the two devices when they are adjacent because the pseudowire endpoints are on adjacent devices, which in a distributed control implementation would have a signaling adjacency as well.

Figure 18:
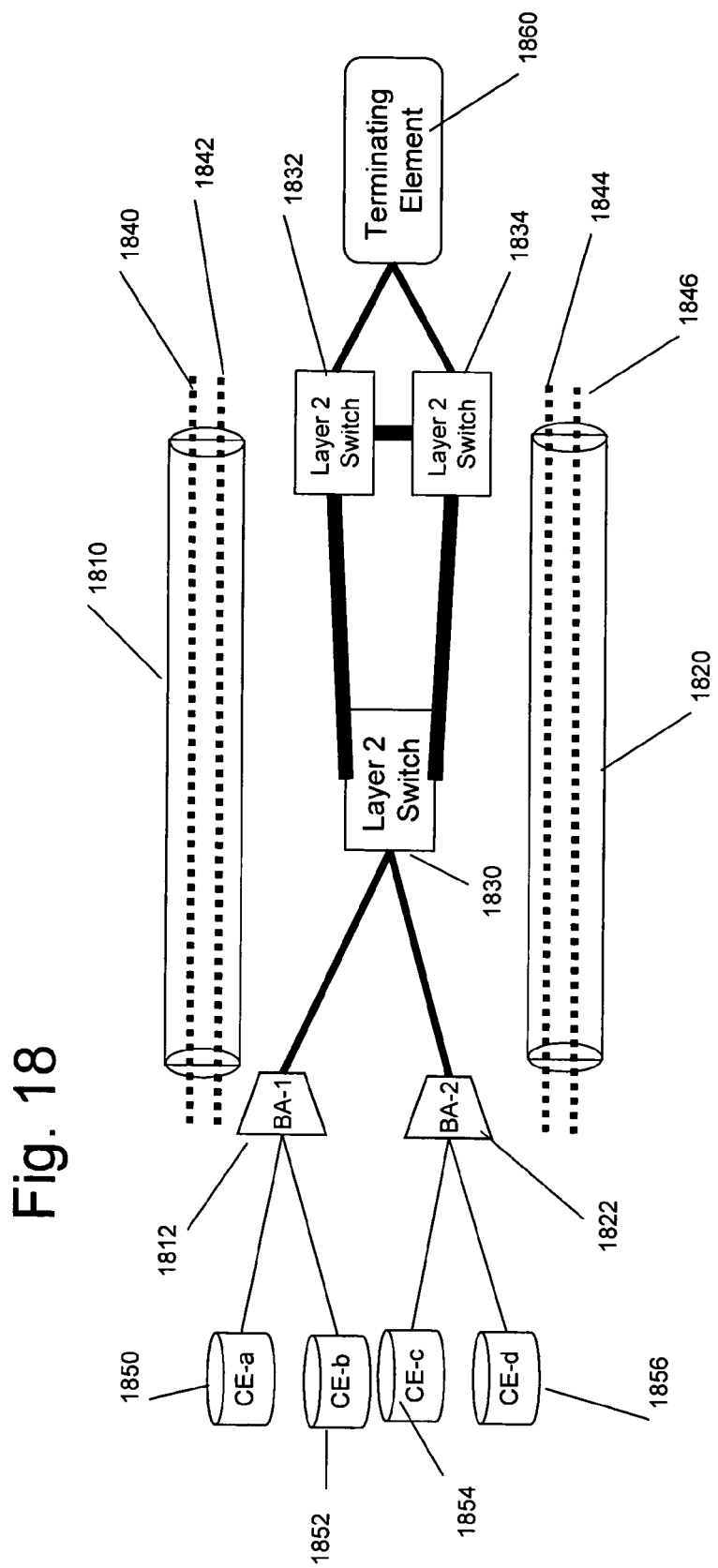

FIG. 18 illustrates the case in which pseudowires and PSN tunnels are configured from customer terminating equipment (CTE) (e.g., equipment coupled to customer equipment, such as a building aggregator, a layer 2 switch, or a building aggregator function incorporated into a layer 2 switch) to a layer 2 switch-service edge interface. This configuration may be particularly useful in situations in which a service edge supports logical sub-interfaces (e.g., VLAN, DLCI) on a single physical interface.

As illustrated in FIG. 18, two PSN tunnels, a first PSN tunnel 1810 from a first building aggregator 1812 (via a first layer 2 switch 1830) to a second layer 2 switch 1832-terminating element 1860 interface and a second PSN tunnel 1820 from a second building aggregator 1822 (via the first layer 2 switch 1830) to a third layer 2 switch 1834-terminating element 1850 interface, are established. Tunneled through the first PSN tunnel 1810 are pseudowires 1840 and 1842 corresponding to customer edges 1850 and 1852, respectively, which are homed by the first building aggregator 1812. Similarly, tunneled through the second PSN tunnel 1820 are pseudowires 1844 and 1846 corresponding to customer edges 1854 and 1856, respectively, which are homed by the second building aggregator 1822. (Note that more than one pseudowire per customer edge may be configured. For example, if different VLANs on a customer edge-building aggregator Ethernet interface are directed to different service edges, it may be desirable to configure a pseudowire for each VLAN.)

Figure 19:
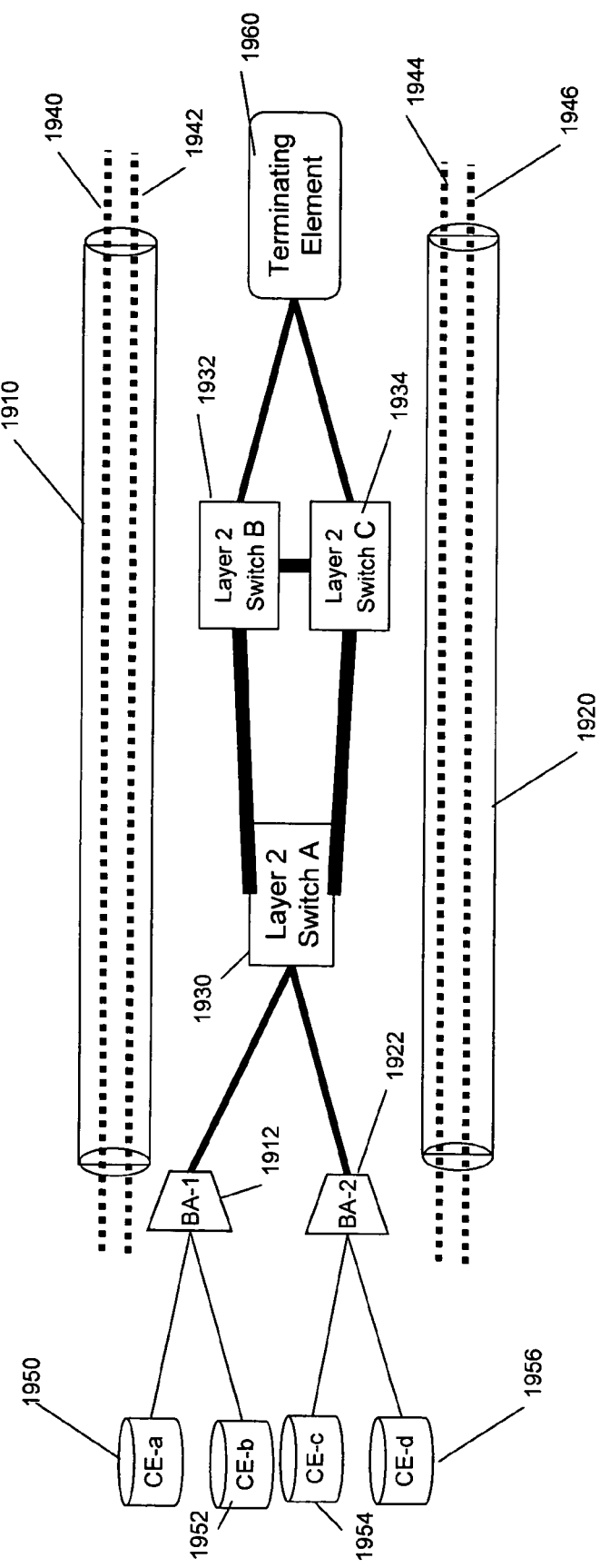

FIG. 19 illustrates the case in which pseudowires and PSN tunnels are established from CTE to a particular service edge. In particular, two PSN tunnels, a first PSN tunnel 1910 from a first building aggregator 1912 (via a first layer 2 switch 1830 and a second layer 2 switch 1932) to terminating element 1960 and a second PSN tunnel 1920 from a second building aggregator 1922 (via the first layer 2 switch 1930 and a third layer 2 switch 1934) to the terminating element 1960, are established. Tunneled through the first PSN tunnel 1910 are pseudowires 1940 and 1942 corresponding to customer edges 1950 and 1952, respectively, which are homed by the first building aggregator 1912. Similarly, tunneled through the second PSN tunnel 1920 are pseudowires 1944 and 1946 corresponding to customer edges 1954 and 1956, respectively, which are homed by the second building aggregator 1922.

This approach may when multiple types of encapsulation across the building aggregator pseudowire endpoints are desirable on the same physical layer 2 switch-service edge interface. This scenario may also allow for control coupling between the service edge and the access network to more easily allow customers to be re-homed to another port on the same service edge or to another service edge. Also, it may allow automatic service level restoration in the event of a service edge or service edge-layer 2 switch port failure. Finally, service parameter configuration, status, and performance correlation may be performed more effectively and with smaller chance of error if this control and management coupling exists.

Figure 20:
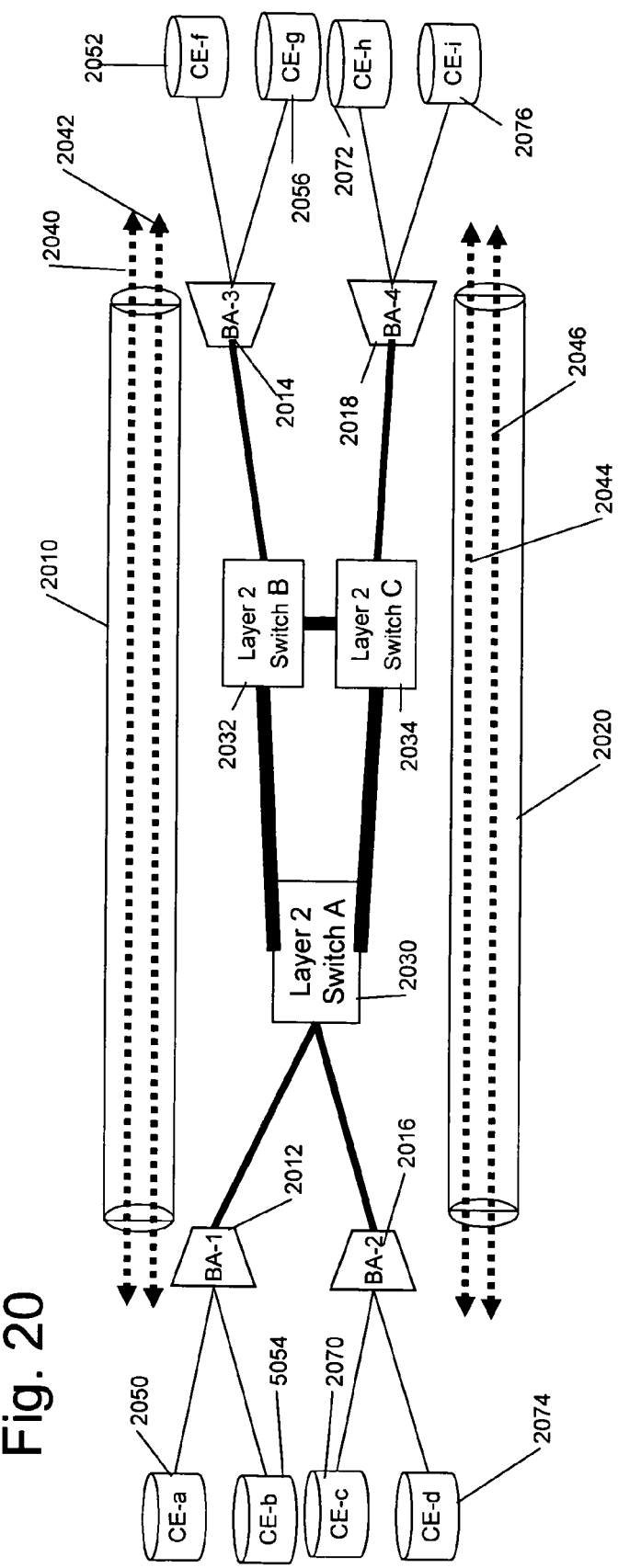

FIG. 20 illustrates the case in which pseudowires and PSN tunnels are established from CTE to another CTE. In particular, two PSN tunnels, a first PSN tunnel 2010 from a first building aggregator 2012 (via a first layer 2 switch 2030 and a second layer 2 switch 2032) to a second building aggregator 2014 and a second PSN tunnel 2020 from a third building aggregator 2016 (via the first layer 2 switch 2030 and a third layer 2 switch 2034) to a fourth building aggregator 2018, are established. Tunneled through the first PSN tunnel 2010 are pseudowires 2040 and 2042 corresponding to pseudowires established between customer edges 2050 and 2052 and between customer edges 2054 and 2056, respectively. Similarly, tunneled through the second PSN tunnel 2020 are pseudowires 2044 and 2046 corresponding to pseudowires established between customer edges 2070 and 2072 and between customer edges 2074 and 2076, respectively. Additional pseudowires may be established.

It should be noted that FIG. 20 illustrates the scenario in which three or more hops are needed. A single or dual hop may use a configuration such as that discussed above with reference to FIG. 17. It should also be noted that a layer 2 switch may perform functions of the building aggregator in this configuration (e.g., for GigE interfaces).

Figure 21:
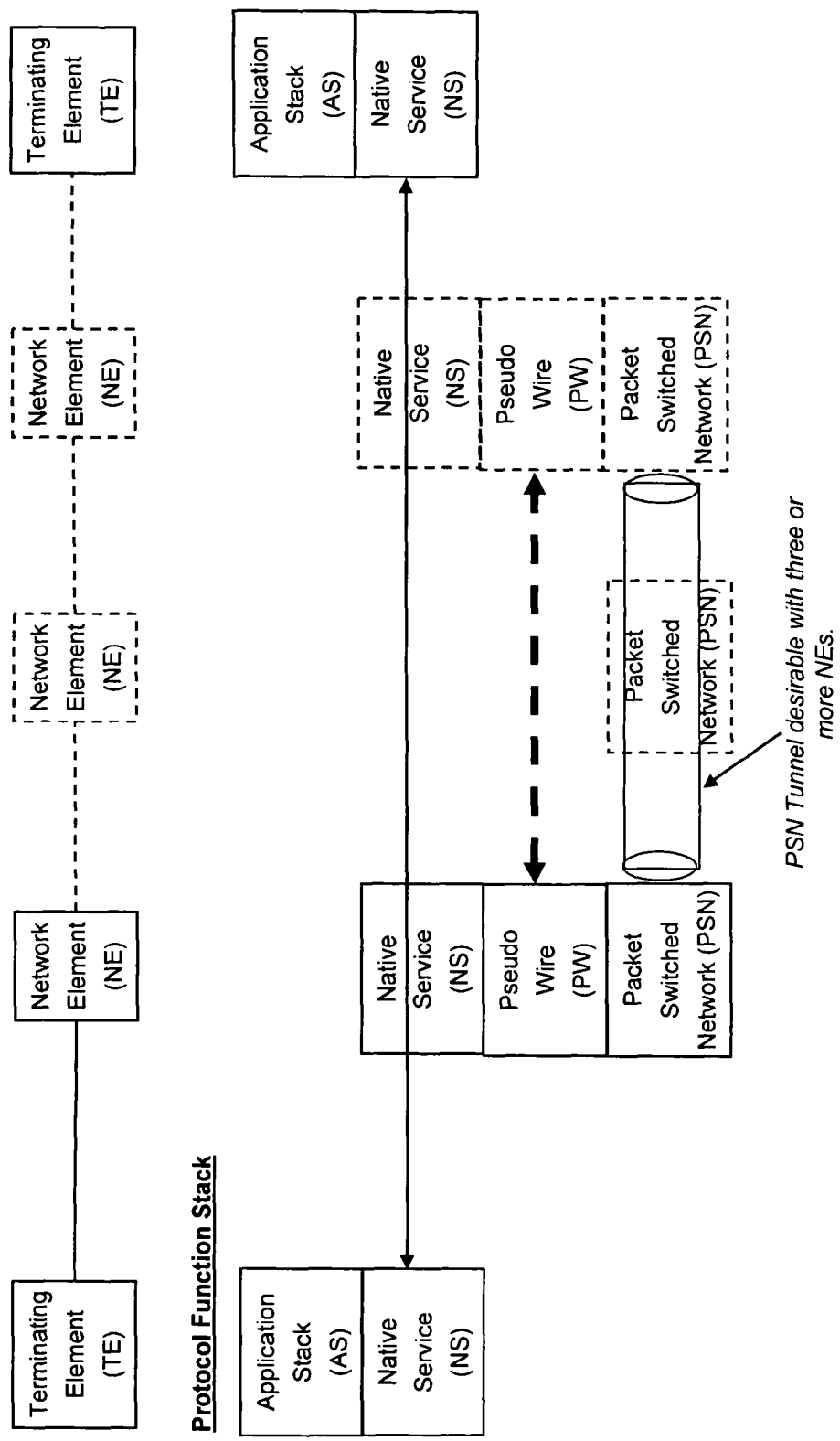
FIG. 21 illustrates a proxy forwarding function in accordance with an embodiment of the present invention.

FIG. 21 illustrates a proxy forwarding function in accordance with an embodiment of the present invention. The proxy forwarding function may be applied on one end (such as may be the case with a layer 2 switch proxy to layer 2 switch-service edge interface, a layer 2 switch proxy to service edge interface, a layer 2 switch proxy to a CTE interface, and the like) or both ends (such as may be the case with a layer 2 switch proxy to layer 2 switch proxy interconnect, or the like).

It should be noted that a terminating element comprises a device that has a Native Service (NS) interface and an Application Stack (AS), such as a customer edge, a service edge, or the like. A network element comprises a component that acts upon communications sent between terminating elements. Examples of a network element include a building aggregator, a layer 2 switch, a service edge processing pseudowires and/or PSN tunnels or the like.

The lower part of FIG. 21 shows the protocol function stack within each device. Within a terminating element, there may be an Application Stack (AS) and a Native Service (NS). Examples of a native service include Ethernet, FR, ATM or TDM. An network element connecting to a terminating element may have an NS function and at least a pseudowire function. In an embodiment, at least one network element interconnects two terminating elements. If there are three or more network elements involved in the path between a pair of terminating elements, then a PSN tunnel may also be used such that intermediate network elements may route traffic in accordance with an outermost tunnel label.

FIGS. 22a-c illustrate network configurations that may be implemented in accordance with an embodiment of the present invention. Regarding FIG. 22a, a configuration in which a single network element that provides a native service interconnect to a pair of terminating elements is shown. In this embodiment, the network element implements a pair of back-to-back pseudowire forwarders, with psuedowire internal to the network element shown by a dashed line.

FIG. 22b shows a configuration in which there are two network elements in the configuration (e.g., a customer edge to building aggregator to layer 2 switch to service edge configuration). In this case, each network element connected to a terminating element may have an instance of a pseudowire forwarder and native service termination.

FIG. 22c shows a configuration in which there are three or more network elements on the path between a pair of terminating elements. In this case, the network elements at the source and destination convert the native service (NS), to a pseudowire, which is nested within a PSN tunnel. In this manner, intermediate network elements may route traffic by evaluating the outermost PSN tunnel label.

The notion of one network element acting as a proxy for another exists in several dimensions. A network element may act as a signaling proxy on behalf of another network element in support of pseudowire forwarding. Another situation is in the forwarding plane, wherein the network element is one hop away from the network element interfacing directly to a terminating element acts as a forwarding proxy on behalf of the network element interfacing to the terminating element. This can simplify the functions in the network element interfacing to the terminating element, but may complicate the functions of the network element acting as the forwarding proxy.

Figure 23A:
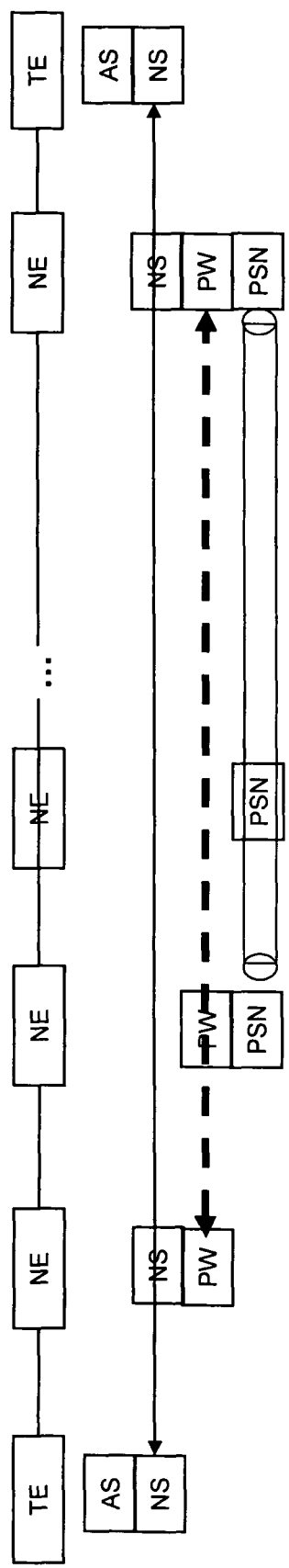
FIGS. 23a-b illustrate proxy forwarding that may be used in accordance with an embodiment of the present invention.
Figure 23B:
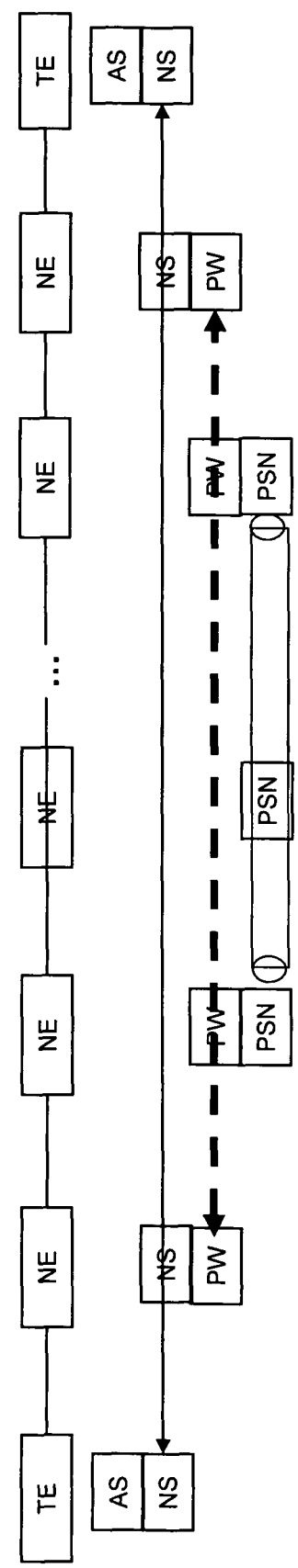

FIGS. 23a-b illustrates proxy forwarding that may be used in accordance with an embodiment of the present invention. In particular, FIG. 23a shows the case in which the PSN tunnel forwarding proxy is implemented on only one end of the path, and FIG. 23b shows the case in which the forwarding proxy is configured at both ends of the path between a pair of terminating elements. As illustrated in FIGS. 23a-b, in an embodiment PSN proxy forwarding is utilized when a PSN tunnel traverses three or more network elements. Thus, in an embodiment, when a PSN tunnel traverses four or more network elements, PSN proxy forwarding may be used on one end of the path, as illustrated in FIG. 23a, and when the PSN tunnel traverses five or more network elements, PSN proxy forwarding may be implemented in each direction as illustrated in FIG. 23b.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing communications in an access network, the method comprising:
   receiving on a first interface a first packetized communication via a carrier-tagged flow, each packet of the first packetized communication having a plurality of carrier tags prepended to a carrier-tagged flow payload;
   determining a second interface on which the first packetized communication is to be routed, the second interface being based upon the first interface and an outermost carrier tag;
   routing the first packetized communication to the second interface,
   wherein the one or more carrier tags are pushed on each packet of the first packetized communication as the first packetized communication travels through the access network.

2. The method of claim 1, further comprising popping one or more carrier tags from the first packetized communication as the first packetized communication travels toward a destination network element.

3. The method of claim 2, wherein the network element comprises a service edge.

4. The method of claim 2, wherein the network element comprises a customer edge.

5. The method of claim 1, further comprising switching one or more carrier tags of the first packetized communication as the first packetized communication travels toward a destination network element.

6. A method for providing communications in an access network, the method comprising:
   receiving a first carrier-tagged flow from a first network device, the first carrier-tagged flow having one or more packets, each packet having a plurality of carrier tags;
   determining a first carrier-tagged path to which the first carrier-tagged flow is to be routed, the determining being based at least in part on a first outermost carrier tag of the carrier tags;
   routing the first carrier-tagged flow to the first carrier-tagged path; and
   switching the first outermost label with a second outermost label.

7. The method of claim 6, wherein the method is performed by a layer 2 switch.

8. The method of claim 6, wherein the first network device comprises a building aggregator.

9. The method of claim 6, wherein the determining is performed in part by traversing a forwarding information base until a physical interface is determined.

10. The method of claim 6, wherein the second outermost label is a tunnel label.

11. The method of claim 6, further comprising:
    receiving a second carrier-tagged flow from a second network device, the second carrier-tagged flow having one or more packets, each packet having one or more carrier tags; and
    merging the first carrier-tagged flow and the second carrier-tagged flow by prepending a common carrier tag to each packet of the first carrier-tagged flow and the second carrier-tagged flow prior to the routing.

12. A method for providing communications in an access network, the method comprising:
    receiving a first carrier-tagged flow from a first network device, the first carrier-tagged flow having one or more packets, each packet having one or more carrier tags;
    determining a second network device to which the first carrier-tagged flow is to be routed, the determining being based at least in part on a first outermost carrier tag of the carrier tags;
    pushing a second outermost carrier tag onto each packet of the first carrier-tagged flow, the second outermost carrier tag indicating a second carrier-tagged flow within which the first carrier-tagged flow is nested; and
    routing the second carrier-tagged flow to the second network device.

13. The method of claim 12, wherein the method is performed by a layer 2 switch.

14. The method of claim 12, wherein the first network device comprises a building aggregator.

15. The method of claim 12, wherein the second network device comprises a layer 2 switch.

16. The method of claim 12, wherein the determining is performed in part by traversing a forwarding information base until a physical interface is determined.

17. The method of claim 12, further comprising switching the first outermost label with a third outermost label.

18. The method of claim 12, wherein the first outermost label comprises a pseudowire label.

19. The method of claim 12, wherein the second outermost label comprises a tunnel label.

20. The method of claim 12, further comprising:
    receiving a second carrier-tagged flow from a second network device, the second carrier-tagged flow having one or more packets, each packet having one or more carrier tags; and
    merging the first carrier-tagged flow and the second carrier-tagged flow by prepending a common carrier tag to each packet of the first carrier-tagged flow and the second carrier-tagged flow prior to the routing.

21. The method of claim 12, wherein the second outermost carrier tag is determined based at least in part on a destination of the second carrier-tagged flow.

22. A method for providing communications in an access network, the method comprising:
- receiving communications from a first network device, the communications comprising one or more packets;
- determining a terminating element to which the communications are to be sent;
- pushing a first carrier tag on each packet of the communications, the first carrier tag indicating a first carrier-tagged flow;
- pushing a second carrier tag on each packet of the communications, the second carrier tag indicating a second carrier-tagged flow, the first carrier-tagged flow being nested within the second carrier-tagged flow; and
- transmitting each packet on the second carrier-tagged flow to a second network element.

23. The method of claim 22, wherein the first network device comprises a customer edge.

24. The method of claim 22, wherein the first network device comprises a building aggregator.

25. The method of claim 22, wherein the first network device comprises a first customer edge and the terminating element comprises a second customer edge.

26. The method of claim 22, wherein the second network device comprises a layer 2 switch.

27. The method of claim 22, wherein the first carrier-tagged flow comprises a pseudowire.

28. The method of claim 27, wherein the first carrier tag comprises a pseudowire label.

29. The method of claim 22, wherein the second carrier-tagged flow comprises a tunnel.

30. The method of claim 29, wherein the second carrier tag comprises a tunnel encapsulation.

31. The method of claim 22, further comprising:
- receiving a third carrier-tagged flow from a third network device, the third carrier-tagged flow having one or more packets, each packet having one or more carrier tags; and
- merging the first carrier-tagged flow and the third carrier-tagged flow by prepending the second carrier tag to each packet of the first carrier-tagged flow and the third carrier-tagged flow prior to the transmitting.

32. The method of claim 22, wherein the pushing the first carrier tag and the pushing the second carrier tag is performed in part by traversing an information base until a physical interface is determined.

33. The method of claim 22, further comprising pushing a first number of carrier tags onto the second carrier-tagged flow, the first number being dependent upon how many times a lookup table is traversed until a physical interface is determined.

34. The method of claim 22, wherein the terminating element comprises a service edge.

35. The method of claim 22, wherein the terminating element comprises a customer edge.

36. A method for providing communications in an access network, the method comprising:
- receiving a first packetized communications from a first network device, the first packetized communications comprising one or more packets, each packet having a first carrier-tag and a second carrier tag prepended to a carrier-tagged flow payload;
- popping the first carrier tag thereby creating a second packetized communications comprising the second carrier tag prepended to the carrier-tagged flow payload;
- determining a terminating element to which the second packetized communications are to be sent, the determining being based at least in part on the first carrier tag; and
- transmitting the second packetized communications to the terminating element.

37. The method of claim 36, wherein the first network device comprises a layer 2 switch.

38. The method of claim 36, wherein the first packetized communications is received via a first carrier-tagged flow.

39. The method of claim 36, wherein the first carrier tag comprises a tunnel encapsulation.

40. The method of claim 36, wherein the second packetized communications is transmitted via a second carrier-tagged flow.

41. The method of claim 36, wherein the second carrier tag comprises a pseudowire label.

42. The method of claim 36, wherein the terminating element comprises a service edge.

43. The method of claim 36, wherein the terminating element comprises a customer edge.

44. A method for providing communications in an access network, the method comprising:
- receiving a first carrier-tagged flow from a first network device, the first carrier-tagged flow having one or more packets, each packet having a first carrier tag and a second carrier tag prepended to a carrier-tagged flow payload;
- popping the first carrier tag from the each packet of the first carrier-tagged flow, thereby creating a second carrier-tagged flow comprising the second carrier tag prepended to the carrier-tagged flow payload;
- determining a destination network element to which the second carrier-tagged flow is to be routed, the destination network element being based at least in part on the first carrier tag; and
- routing the second carrier-tagged flow to the destination network element.

45. The method of claim 44, wherein the method is performed by a layer 2 switch.

46. The method of claim 44, wherein the first network device comprises a service edge.

47. The method of claim 44, wherein the first network device comprises a building aggregator.

48. The method of claim 44, wherein the first network device comprises a customer edge.

49. The method of claim 44, wherein the first network device comprises a layer 2 switch.

50. The method of claim 44, wherein the destination network element comprises a building aggregator.

51. The method of claim 44, wherein the first carrier-tagged flow is nested within another carrier-tagged flow.

52. The method of claim 44, wherein the first carrier tag comprises a tunnel label.

53. The method of claim 44, wherein the second carrier tag comprises a pseudowire label.

54. The method of claim 44, wherein the determining is performed in part by traversing an forwarding information base until a physical interface is determined.

55. The method of claim 44, further comprising pushing a first number of carrier tags onto the second carrier-tagged flow, the first number being dependent upon how many times a lookup table is traversed until a physical interface is determined.

56. A method for providing communications in an access network, the method comprising:
  receiving a first carrier-tagged flow from a first network device, the first carrier-tagged flow comprising a first carrier tag prepended to a first nested carrier-tagged flow and a second carrier tag prepended to a second nested carrier tagged flow;
  popping the first carrier tag from the first nested carrier-tagged flow;
  determining a first destination network element to which the first nested carrier-tagged flow is to be routed, the determining the first destination network element being based at least in part on the first carrier tag;
  routing the first nested carrier-tagged flow to the first destination network element;
  popping the second carrier tag from the second nested carrier-tagged flow;
  determining a second destination network element to which the second nested carrier-tagged flow is to be routed, the determining the second destination network element being based at least in part on the second carrier tag; and
  routing the second nested carrier-tagged flow to the second destination network element.

57. The method of claim 56, wherein the method is performed by a layer 2 switch.

58. The method of claim 56, wherein the first network device is a terminating element.

59. The method of claim 56, wherein the first network device comprises a service edge.

60. The method of claim 56, wherein the first network device comprises a customer edge.

61. The method of claim 56, wherein the first network device comprises a building aggregator.

62. The method of claim 56, wherein the first network device comprises a layer 2 switch.

63. The method of claim 56, wherein the first destination network element comprises a building aggregator.

64. The method of claim 56, wherein the second destination network element comprises a building aggregator.

65. The method of claim 56, wherein the first destination network element and the second destination network element are different network elements.

66. The method of claim 56, wherein the first carrier-tagged flow comprises a tunnel.

67. The method of claim 56, wherein the first nested carrier-tagged flow and the second nested carrier-tagged flow comprises pseudowires nested within a tunnel.

68. The method of claim 56, wherein the determining the first destination network element and the determining the second destination network element are performed in part by traversing an forwarding information base until a physical interface is determined.

69. A method for providing communications in an access network, the method comprising:
  receiving a carrier-tagged flow from a first network device, the carrier-tagged flow comprising one or more packets, each packet comprising at least a first carrier tag and a second carrier tag prepended to a carrier-tagged flow payload;
  popping the first carrier tag from each packet;
  determining a terminating element to which the communications are to be sent, the determining being based at least in part on the first carrier tag; and
  transmitting the carrier-tagged flow payload to a customer edge.

70. The method of claim 69, wherein the first network device comprises a service edge.

71. The method of claim 69, wherein the first network device comprises the customer edge.

72. The method of claim 69, wherein the terminating element comprises a service edge.

73. The method of claim 69, wherein the terminating element comprises the customer edge.

74. The method of claim 69, wherein the terminating element comprises a building aggregator.

75. The method of claim 69, wherein the first network device comprises a layer 2 switch.

76. The method of claim 69, wherein the method is performed by a layer 2 switch.

77. The method of claim 69, wherein the carrier-tagged flow comprises a pseudowire.

78. The method of claim 69, wherein the carrier-tagged flow comprises a tunnel.

79. The method of claim 69, wherein the carrier tag comprises a pseudowire label.

80. The method of claim 69, wherein the carrier tag comprises a tunnel label.

81. The method of claim 69, wherein the determining is performed in part by traversing a forwarding information base until a physical interface is determined.

82. A method for implementing a proxy function by a first network element, the method comprising:
  receiving by the first network element communications from a second network element, the first network element performing for the first terminating element a first forwarding proxy function that includes pushing a first carrier tag on the communications from the second network element to form a first carrier-tagged flow;
  pushing a second carrier tag on the first carrier-tagged flow to form a second carrier-tagged flow;
  determining a third network element to which the second carrier-tagged flow is to be routed, the determining being based at least in part on the second carrier tag; and
  sending the second carrier-tagged flow to the third network element.

83. The method of claim 82, wherein the second network element comprises a building aggregator.

84. The method of claim 82, wherein the second network element comprises a layer 2 switch.

85. The method of claim 82, wherein the first network element comprises a layer 2 switch.

86. The method of claim 82, wherein the communications comprise packetized communications.

87. The method of claim 82, wherein the first carrier tag comprises a pseudowire label.

88. The method of claim 82, wherein the second carrier tag comprises a tunnel label.

89. A method for establishing carrier-tagged paths within an access network, the method comprising:
  establishing a carrier-tagged path between a first network element and a second network element, the carrier-tagged path being identified by a first carrier tag;
  establishing a first control link between the first and second network element;
  establishing control links between the first network element and one or more customer terminating equipments;
  receiving a control message by the first network element from the second network element, the control message comprising at least an identifier of a specific customer terminating equipment;

distributing a second carrier tag over the control link between the first network element and the specific customer terminating equipment;

receiving communications by the first network element from the customer terminating equipment, the communications including the second carrier tag; and sending the communications to the second network element on the carrier-tagged path.

90. The method of claim 89 further comprising associating the second carrier tag with the first carrier tag in the customer terminating equipment.

91. The method of claim 89, wherein the associating is performed by creating an entry in an information base.

92. The method of claim 89, wherein the distributing is performed in part by using Label Distribution Protocol between the first network element and the customer terminating equipment.

93. The method of claim 89, wherein the customer terminating equipment comprises a building aggregator.

94. The method of claim 89, wherein the carrier-tagged path comprises a tunnel.

95. The method of claim 89, wherein the carrier-tagged path comprises a pseudowire.

96. The method of claim 89, wherein the associating is performed by creating an entry in an information base.

97. The method of claim 89, wherein the distributing is performed in part by using Label Distribution Protocol between the first network element and the second network element.

98. The method of claim 89, wherein the distributing is performed in part by using Label Distribution Protocol between a layer 2 switch and a building aggregator.

* * * * *